(12) United States Patent
Fujiwara et al.

(10) Patent No.: US 9,139,706 B2
(45) Date of Patent: Sep. 22, 2015

(54) PREPREG, FIBER-REINFORCED COMPOSITE MATERIAL, AND METHOD FOR PRODUCING PREPREG

(75) Inventors: Takayuki Fujiwara, Ehime (JP); Jun Misumi, Ehime (JP); Ayumi Matsuda, Ehime (JP); Kenichi Yoshioka, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 275 days.

(21) Appl. No.: 13/583,476

(22) PCT Filed: Mar. 29, 2011

(86) PCT No.: PCT/JP2011/057835
§ 371 (c)(1),
(2), (4) Date: Sep. 7, 2012

(87) PCT Pub. No.: WO2011/122631
PCT Pub. Date: Oct. 6, 2011

(65) Prior Publication Data
US 2012/0328858 A1 Dec. 27, 2012

(30) Foreign Application Priority Data

Mar. 30, 2010 (JP) ................................. 2010-077077

(51) Int. Cl.
*B32B 7/02* (2006.01)
*B32B 38/08* (2006.01)
(Continued)

(52) U.S. Cl.
CPC ... *C08J 5/24* (2013.01); *B32B 5/26* (2013.01); *B32B 5/28* (2013.01); *C08G 59/4021* (2013.01);
(Continued)

(58) Field of Classification Search
USPC .................................... 428/213; 156/60, 242
See application file for complete search history.

(56) References Cited

U.S. PATENT DOCUMENTS 4,474,852 A * 10/1984 Craig ............................ 428/403
5,028,478 A    7/1991 Odagiri et al.
(Continued)

FOREIGN PATENT DOCUMENTS

CN      1953790 A    4/2007
JP      63-162732 A  7/1988
(Continued)

OTHER PUBLICATIONS

Machine_English_Translation_JP_2004149979_A; Sakajiri; Carbon Fiber Strand, May 27, 2004; JPO; whole document.*
(Continued)

*Primary Examiner* — Tahseen N Khan
(74) *Attorney, Agent, or Firm* — Birch, Stewart, Kolasch & Birch, LLP

(57) ABSTRACT

A prepreg containing components (A) to (C) defined below, wherein component (A) is placed on one surface or both surfaces of a layer comprising components (B) and (C), 90% or more by area of component (A) being present in a region(s) extending from the surface(s) of the resulting prepreg containing components (A) to (C) to a depth equal to 20% of the average thickness of the prepreg: (A) urethane particles having tan δ of 0.15 or more at 10° C. and having a three-dimensional cross-linked structure, (B) a first epoxy resin composition, and (C) reinforcing fiber. The present invention provides a fiber-reinforced composite material which excels in rigidity, strength, and vibration damping properties, and a prepreg which is suitably used for production thereof, and also provides methods for production thereof.

15 Claims, 4 Drawing Sheets

(51) Int. Cl.

| | |
|---|---|
| *B32B 37/18* | (2006.01) |
| *C08J 5/24* | (2006.01) |
| *C08G 59/40* | (2006.01) |
| *C08G 59/42* | (2006.01) |
| *C08G 59/50* | (2006.01) |
| *C08L 63/00* | (2006.01) |
| *B32B 5/26* | (2006.01) |
| *B32B 5/28* | (2006.01) |
| *C08K 7/02* | (2006.01) |

(52) U.S. Cl.
CPC ........ *C08G 59/4215* (2013.01); *C08G 59/5033* (2013.01); *C08L 63/00* (2013.01); *B32B 2250/05* (2013.01); *B32B 2250/20* (2013.01); *B32B 2260/023* (2013.01); *B32B 2260/046* (2013.01); *B32B 2262/106* (2013.01); *B32B 2264/0292* (2013.01); *B32B 2307/54* (2013.01); *B32B 2307/56* (2013.01); *B32B 2307/718* (2013.01); *C08J 2363/00* (2013.01); *C08J 2475/04* (2013.01); *C08K 7/02* (2013.01); *Y10T 156/10* (2015.01); *Y10T 428/2495* (2015.01)

(56) References Cited

U.S. PATENT DOCUMENTS

| | | | |
|---|---|---|---|
| 5,789,073 A * | 8/1998 | Odagiri et al. | 428/297.4 |
| 6,037,019 A * | 3/2000 | Kooyer et al. | 427/598 |
| 2004/0214007 A1 | 10/2004 | Brown et al. | |
| 2005/0277488 A1 | 12/2005 | Onoda et al. | |
| 2010/0304119 A1 | 12/2010 | Bonneau et al. | |

FOREIGN PATENT DOCUMENTS

| | | | |
|---|---|---|---|
| JP | 63-170427 A | | 7/1988 |
| JP | 63-170428 A | | 7/1988 |
| JP | 63-203327 A | | 8/1988 |
| JP | 64-26651 A | | 1/1989 |
| JP | 4-207139 A | | 7/1992 |
| JP | 5-27783 A | | 2/1993 |
| JP | 06136320 A | * | 5/1994 |
| JP | 7-41577 A | | 2/1995 |
| JP | 8-283435 A | | 10/1996 |
| JP | 9-85844 A | | 3/1997 |
| JP | 9-216958 A | | 8/1997 |
| JP | 2003-12889 A | | 1/2003 |
| JP | 2004-149979 A | | 5/2004 |
| JP | 2004149979 A | * | 5/2004 |
| JP | 2008-50587 A | | 3/2008 |
| JP | 2008-237373 A | | 10/2008 |
| JP | 2009-261473 A | | 11/2009 |

OTHER PUBLICATIONS

Machine English_Translation_JP_06136320_A; Uchida, Shinji; Production of Moisture-Permeable Waterproof Coated Molding; May 17, 1994; JPO; whole document.*

International Search Report of PCT/JP2011/057835 mailed on Apr. 26, 2011.

Notice of Reasons for Refusal dated Jan. 31, 2012; priority Japan Patent Application No. 2011-514913.

Extended European Search Report, dated Jul. 29, 2013 for European Patent Application No. 11762855.2.

* cited by examiner

PREPREG, FIBER-REINFORCED COMPOSITE MATERIAL, AND METHOD FOR PRODUCING PREPREG

TECHNICAL FIELD

The present invention relates to a fiber-reinforced composite material which excels in rigidity, strength, and vibration damping properties, and which are suitable for sports applications and general industrial applications, also relates to a prepreg which is suitably used for production thereof and a method for production thereof.

More specifically, the present invention relates to a fiber-reinforced composite material which can be suitably applied to production of, for example, various frames, pipes, shafts, wheels, and curved circular plates thereof that are used in aircraft, ships, automobiles, bicycles, etc., and industrial machines such as pumps and bush cutters; tubular bodies such as golf club shafts, fishing rods, ski poles, badminton racket shafts, and tent poles; various sporting/leisure goods such as skis, snow boards, golf club heads, bicycle rims; and civil engineering and construction materials, as well as repair and reinforcement materials therefor; and also relates to a prepreg which is suitably used for production thereof as well as to a method for production thereof.

BACKGROUND ART

Fiber-reinforced composite materials in which carbon fibers or aramid fibers are used as reinforcement fibers, are widely used, taking advantage of their high specific strengths and specific elastic moduli, for structural materials for aircraft, automobiles, etc.; and for purposes such as sports/general industrial applications including tennis rackets, golf shafts, and bicycles.

In most golf clubs in recent years, the heads are made of metal, and moreover, head sizes have increased. The cause increased vibrations transmitted to hands and an increased sense of rigidity during ball hitting. Consequently, there has been an increasing demand for improvements in vibration damping properties and in the feeling of ball hitting.

Patent Document 1 discloses a golf shaft in which a vibration damping layer formed of a metal fiber braid is provided at least in a portion in the longitudinal direction of a shaft formed of fiber-reinforced resin. However, in this case, while vibration damping properties are improved, the shaft mass increases because they comprise metal fibers having higher specific weight than that of carbon fibers, which are usually used for golf shafts.

Furthermore, Patent Document 2 discloses a golf shaft in which one or more layers of polyester are provided between fiber-reinforced resin layers or on the inner surface of the innermost fiber-reinforced resin layer. In this case, while vibration damping properties are improved, the flexural strength and the torsional strength of the shaft decrease because the modulus of such polyester is lower than that of epoxy resin, which is usually used as matrix resin for fiber-reinforced resin for golf shafts.

As for tennis rackets as well, there are demands for weight reduction, better resiliency, and improved operability. Thus positive use is made of carbon fiber composite materials in which epoxy resin is used as matrix. A shock applied when a ball is hit using a racket is transmitted as vibrations to a human body. It is known that if these vibrations are repeatedly received, fatigue accumulates in the elbow, thus causing a so-called tennis elbow, in which pain develops in the elbow. It has been agreed that such vibrations are preferably reduced.

Patent Document 3 discloses a tennis racket made of a fiber-reinforced composite material in which an epoxy resin composition that contains a specific epoxy resin component, epoxy-incompatible rubber particles and polyvinyl formal, is used as matrix resin. In this case, some rubber particles which are incompatible with epoxy resin enter the interior of reinforcing fiber bundles and the other rubber particles are filtered, with the result that a larger quantity of rubber component exists on the surface of the prepreg than in its interior. Consequently, subsequent to lamination, a large quantity of rubber component can exist between prepreg layers. Therefore, it is possible to provide a racket which has higher vibration damping properties and excels in hitting feeling, as compared to a case where minute rubber particles which are soluble in epoxy resin are used to allow the rubber component to be distributed uniformly. However, since rubber particles having lower modulus than an epoxy resin enter the interior of reinforcing fiber bundles, the matrix resin's modulus decreases, resulting in a decrease in the racket rigidity and strength.

Meanwhile, Patent Document 4 exemplifies a prepreg which is characterized in that the entry of particles into reinforcing fiber bundles is restricted, and that a large number of particles are present on the surface of the prepreg. In this case, polyamide 12 particles are applied. Although shock resistance and fatigue properties improve, vibration damping properties near room temperature are not sufficient.

Furthermore, Patent Document 5 exemplifies a fishing rod in which vibration damping properties are enhanced for the purpose of transmitting slight fish bites with high sensitivity. In this document, a urethane elastomer sheet is placed between fiber reinforced resin layers. This elastomer sheet greatly improves vibration damping properties, but significantly reduces the rigidity and the strength of the fiber reinforced material.

PRIOR ART DOCUMENTS

Patent Documents

[Patent Document 1]
Japanese Unexamined Patent Publication (Kokai) No. 2009-261473
[Patent Document 2]
Japanese Unexamined Patent Publication (Kokai) No. 2008-237373
[Patent Document 3]
Japanese Unexamined Patent Publication (Kokai) No. 2003-012889
[Patent Document 4]
Japanese Unexamined Patent Publication (Kokai) No. 1996-283435
[Patent Document 5]
Japanese Unexamined Patent Publication (Kokai) No. 1992-2071395

SUMMARY OF THE INVENTION

Problems to be Solved by the Invention

It is an object of the present invention to solve the problem of providing a fiber-reinforced composite material which excels in rigidity, strength, and vibration damping properties; and a prepreg which is suitably used for production thereof; as well as a method for production thereof.

Means for Solving the Problem

As a result of extensive research, the inventors found that it is possible to solve said problem by means of a fiber-reinforced composite material having a specific configuration, and of a prepreg used to obtain said material, with the consequence that this invention was completed. Thus, the present invention has the following constitution.

(1) A prepreg containing components (A) to (C) defined below, wherein component (A) is placed on one surface or both surfaces of a layer comprising components (B) and (C), 90% or more by area of component (A) being present in a region(s) extending from the surface(s) of the resulting prepreg containing components (A) to (C) to a depth equal to 20% of the average thickness of the prepreg:

(A) urethane particles having tan δ of 0.15 or more at 10° C. and having a three-dimensional cross-linked structure, (B) a first epoxy resin composition, and (C) reinforcing fiber.

(2) A fiber-reinforced composite material which comprises components (E) to (G) that are defined below, and in which 90% or more by area of component (E) is localized in (an) interlayer region(s), as observed in a cross section:

(E) urethane particles having a tan δ of 0.15 or more at 10° C. and having a three-dimensional cross-linked structure, (F) cured resin of a third epoxy resin composition, and (G) reinforcing fiber.

(3) A production method containing a step of obtaining a prepreg precursor by impregnating component (C) with component (B) and a step of sticking component (A) to the prepreg precursor.

(4) A prepreg production method containing the following steps (I) to (III):

(I) step of dispersing component (A) in component (D), and processing them into a film, (II) step of impregnating component (C) with component (B) and preparing a prepreg precursor, and (III) step of sticking the film resulting from step (I) to the prepreg precursor resulting from step (II).

Effect of the Invention

According to the present invention, it is possible to provide a fiber reinforced composite material which excels in rigidity, strength, and vibration damping properties; and a prepreg which is suitably used for production thereof. That is, by means of the fiber reinforced composite material and the prepreg of the present invention, it is possible to improve vibration damping properties of fiber reinforced composite material without reducing rigidity or strength, by causing urethane particles having high vibration damping properties and a three-dimensional cross-linked structure to be localized between fiber reinforced composite material layers. The present invention is useful for purposes such as improvement in the ball hitting feeling of golf club shafts, increase in shock absorbing properties of tennis rackets, and improvement in fish bite sensitivity of fishing rods.

Figure 1:
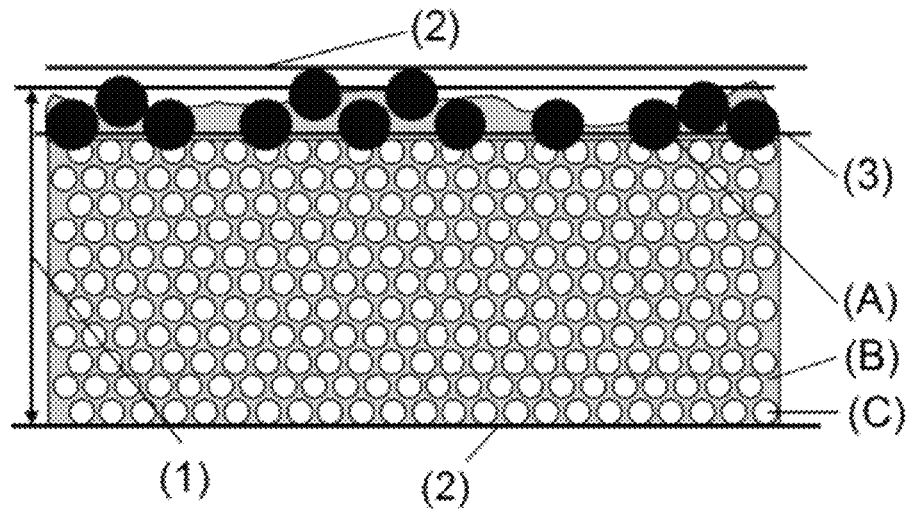
FIG. 1
Figure 2:
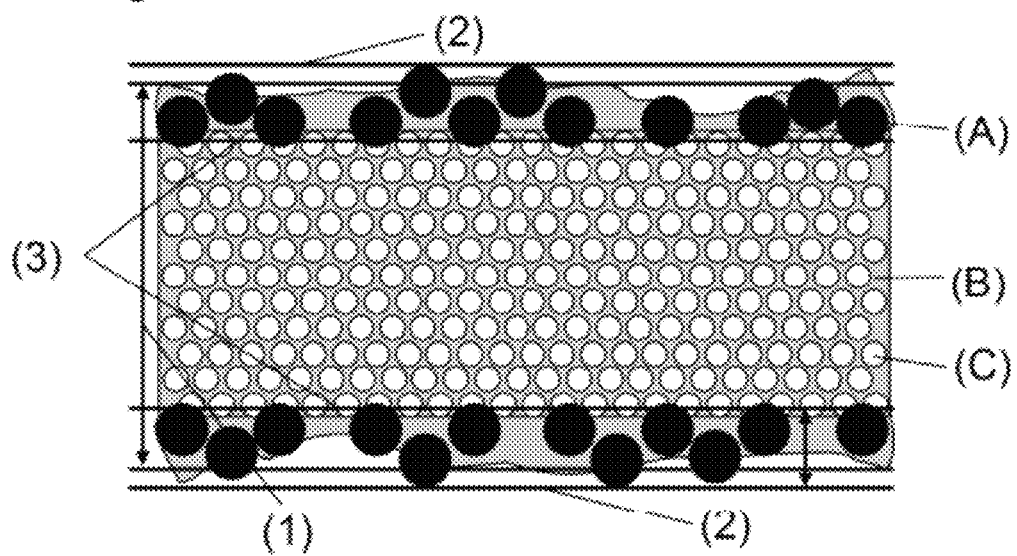

This is a cross-sectional view of a prepreg which comprises components (A) to (C) and in which component (A) is placed on one surface of a layer formed of components (B) and (C).

FIG. 2

This is a cross-sectional view of a prepreg which comprises components (A) to (C) and in which components (A) are placed on both surfaces of a layer formed of components (B) and (C).

FIG. 3

This is a cross-sectional view of a prepreg which comprises components (A) to (D) and in which component (A) in a state of being contained in component (D) is placed on one surface of a layer formed of components (B) and (C).

FIG. 4

This is a cross-sectional view of a prepreg which comprises components (A) to (D) and in which component (A) in a state of being contained in components (D) is placed on both surfaces of a layer formed of components (B) and (C).

FIG. 5

This is a cross-sectional view of a fiber reinforced composite material which comprises components (E) to (G) and in which component (E) is placed between layers of a laminate formed of components (F) and (G).

FIG. 6

This is a cross-sectional view of a fiber reinforced composite material which comprises components (E) to (H) and in which components (E) and (H) are placed between layers of a laminate formed of components (F) and (G), and in which components (E) are placed in a state of being contained in components (H).

DESCRIPTION OF EMBODIMENTS

The present invention will be explained in further detail below. A prepreg of the present invention comprises the following components (A) to (C):

(A) urethane particles having tan δ of 0.15 or more at 10° C. and having a three-dimensional cross-linked structure, (B) a first epoxy resin composition, and (C) reinforcing fiber.

FIG. 1 to FIG. 4 show cross-sections of preferable embodiments of the prepreg according to the present invention. As shown in FIG. 1 to FIG. 4, component (C) is impregnated with component (B), thus forming a layer, and component (A) is placed on one surface or both surfaces of the layer formed of components (B) and (C).

It is necessary that component (A) is urethane particles having a three-dimensional cross-linked structure. The use of urethane particles having a three-dimensional cross-linked structure makes it possible to provide a fiber-reinforced composite material having excellent rigidity, strength, and vibration damping properties. If no cross-linked structure is present, the urethane particles are liable to dissolve in component (B), which is the first epoxy resin composition as described in detail below. In this case, the resulting fiber-reinforced composite material is low in rigidity, strength, and glass transition temperature. In addition, it cannot be expected to achieve improvement in vibration damping properties. For the same reason, it is preferable that component (A) and component (B) are incompatible with each other.

In this regard, the following products can be mentioned, among others, as urethane particles having three-dimensional cross-linked structures: "DAIMICBEAZ (registered trademark)" UCN-5070 and 5150 (these products are manufactured by Dainichiseika Color & Chemicals Mfg. Co., Ltd.); and "Art Pearl (registered trademark)" C-400, P-400T, JB-400T, and CE-400T (these products are manufactured by Negami Chemical Industrial Co., Ltd.).

The fact that component (A) and component (B) are incompatible with each other can be confirmed from the glass transition temperature that is determined from storage modulus curve based on dynamic viscoelasticity measurements of a cured resin composition obtained by curing a resin composition comprising component (A) and component (B). That is, dynamic viscoelasticity measurements are used to determine the glass transition temperatures of the following items: a cured resin composition obtained by curing a resin composition comprising component (A) and component (B); a plate-like molded product formed only of component (A); and a cured resin obtained by curing component (B) only. If component (A) and component (B) are incompatible with each other, a cured resin composition obtained by curing a resin composition comprising component (A) and component (B) gives glass transition temperatures at the same temperatures as the glass transition temperature of a plate-like molded product formed of component (A) only and that of a cured resin obtained by curing component (B) only. Here, being the same temperature means that the difference in glass transition temperature is in the range of −3 to 3° C.

A cured resin formed of component (A) and component (B) is prepared as follows: Component (A) and component (B) are kneaded, and the resin composition obtained is defoamed in a vacuum. Thereafter, the resin composition is poured into a mold which is set up by means of a 2 mm thick "Teflon (registered trademark)" spacer so that the molding thickness will be 2 mm. Then curing is performed under conditions where component (B) completely cures, resulting in a plate-like cured resin free of voids. Here, the term "conditions where component (B) completely cures" refers to a state where no residual heat generation is observed when the cured resin obtained by curing is subjected to differential scanning calorimetry.

Furthermore, a plate-like molded product formed of component (A) only is produced by placing component (A) in a 2 mm stainless steel mold, and press-molding it for five minutes at 50 kg/cm$^2$.

A cured resin formed of component (B) only is prepared as follows: Component (B) is defoamed in a vacuum, and poured into a mold which is set up by means of a 2 mm thick "Teflon (registered trademark)" spacer so that the molding thickness will be 2 mm. Then curing is performed under conditions where component (B) completely cures, resulting in a plate-like cured resin free of voids.

Furthermore, it is necessary that component (A) has tan δ at 10° C. of 0.15 or more, more preferably 0.2 or more. If the tan δ is less than 0.15, vibration damping properties will not be sufficient. Here, the tan δ at 10° C. can be measured by dynamic viscoelasticity measurement of a plate-like cured resin formed only of component (A) prepared by the method mentioned above.

It is necessary that 90% or more by area of component (A) be present in a region extending from the surface of a prepreg to a depth corresponding to 20% of the average thickness of the prepreg. In other words, on the assumption that the area of the entire component (A) contained in a prepreg which contains components (A) to (C) accounts for 100%, it is necessary that 90% or more by area of component (A) exists in the vicinity of the surface of the prepreg, that is, in a region extending from the surface of the prepreg to a depth corresponding to 20% of the average thickness of the prepreg. As shown in the cross-sectional view of a prepreg in FIG. 1 to FIG. 4, since component (A) is distributed with a higher concentration on one surface or both surfaces of the prepreg than in the interior of the prepreg, it is possible to obtain a fiber-reinforced composite material which excels in rigidity, strength, and vibration damping properties. If the percentage of component (A) which exists in a region extending from the surface of a prepreg to a depth corresponding to 20% of the average thickness of the prepreg is less than 90% by area, then urethane particles having lower modulus than an epoxy resin composition enters the interior of a reinforcing fiber bundle, with the result that not only the rigidity and the strength of the fiber-reinforced composite material are reduced, but also the vibration damping improvement effect is decreased.

Here, the degree of localization of the particles in the prepreg can be evaluated by the method disclosed in the Japanese Unexamined Patent Publication (Kokai) No. 1989-104624. That is, firstly, the prepreg is kept tight between two flat, smooth support plates. Then the temperature is gradually raised over many hours, and the prepreg is cured. What is particularly important at this time is to perforin gelling at as low a temperature as possible. If the temperature is raised before gelling occurs, the resin inside the prepreg flows, and particles move. Therefore, it is impossible to make precise evaluation of the particle distribution in the original prepreg. After gelling, the temperature is gradually raised over further time to cure the prepreg. The cross section of the cured prepreg is magnified by 200 times or more, and photographed (see FIG. 1 to FIG. 4). Firstly, this cross-sectional photograph is used to obtain the average thickness of the prepreg. The average thickness of the prepreg (1) is obtained by measuring the thickness at at least five places randomly selected on the picture, and taking the average value. Next, at the position of 20% of the thickness of the prepreg from the surface (2) in contact with each supporting plate, lines (3) are drawn parallel to the facial direction of the prepreg. The cross-sectional areas of the particles present between the parallel lines at 20% and the surfaces, which have been in contact with the support plates, are determined for both surfaces of the prepreg. Then the cross-sectional areas of the particles present in the entire width of the prepreg are determined. Calculation of the ratio between the two cross-sectional areas gives the percentage of the particles present between the prepreg surfaces and the depths corresponding to 20% of the prepreg thickness, namely, the surface localization rate. The determination of the particle's cross-sectional areas may be performed using an image analyzer, or calculation may be made by cutting out all particle portions in a predetermined region from the cross-sectional photograph, and measuring the mass of the cut-out portions. For the purpose of eliminating the influence of partial scattering in the distribution of particles, this evaluation is performed for the entire width of the photograph, and is performed for photographs taken at five or more randomly selected places, followed by averaging the results. When it is difficult to distinguish between particles and matrix resin, either of them is selectively stained and observed. The microscope to be used may be either an optical microscope or a scanning electron microscope. It is advisable to use either of them depending on particle size and the staining method used. In this regard, for the present invention, the ratio of particles localized near the prepreg surfaces is measured on the basis of area ratio. However, this procedure is substantially equivalent to measuring the mass ratio, since the mass ratio of particles is equal to their area ratio.

To cause 90% or more by area of component (A) to exist in a region extending from the surface of the prepreg to a depth corresponding to 20% of the average thickness of the prepreg, it is preferable that the average particle diameter of component (A) is 5 μm or more. The average particle diameter mentioned here refers to a volume mean particle diameter, and can be measured by using a Nanotrack Particle Size Distribution Measuring Instruments (manufactured by Nikkiso Co., Ltd.) or by using LMS-24 (manufactured by Seishin Enterprise Co., Ltd.) in accordance with JIS K5600-9-3 (2006). By using component (A) whose average diameter is 5 μm or more, component (A) is filtered by the reinforcing fiber bundles of component (C), thus easily localizing near the surface of the prepreg. Furthermore, it is preferable that the average particle diameter of component (A) is 20 μm or less.

If the average particle diameter exceeds 20 μm, the thicknesses of regions between reinforcing fiber layers undergo increases in the fiber-reinforced composite material obtained by laminating and curing the prepreg of the present invention. Therefore, voids are liable to be generated at interlayers. In that case, if the quantity of epoxy resin composition is increased for the purpose of curbing the occurrence of voids, it follows that the reinforcing fiber content in the fiber-reinforced composite material drops, with the result that the rigidity and the strength tend to decrease.

In this connection, "the thicknesses of regions between reinforcing fiber layers" as mentioned here refers to the thickness of each reinforcing fiber-free region which is located between a reinforcing fiber layer and another reinforcing fiber layer adjacent thereto.

It is preferable that the percentage of component (A) contained in the prepreg is 2 to 20% by mass, more preferably 2 to 10% by mass. If the content is less than 2% by mass, there is a tendency that while the rigidity and the strength of the fiber-reinforced composite obtained are high, the vibration damping properties deteriorate. Meanwhile, if the content exceeds 20% by mass, there is a tendency that while the vibration damping properties of the fiber-reinforced composite material obtained are good, the rigidity and the strength tend to be excessively reduced.

Furthermore, as for component (A), it is preferable that the surfaces of urethane resin particles are coated with hydrophobic silica. Covering said surfaces with hydrophobic silica makes it possible to prevent particles in component (A) in the epoxy resin composition from becoming bulky as a result of flocculating with one another or undergoing fusion due to heating. Accordingly, the thicknesses of regions between reinforcement resin layers obtained from the prepreg of the present invention can be easily controlled on the basis of the average particle diameter and the mixing proportion of component (A). Therefore, it becomes easy to adjust the rigidity, the strength, and the vibration damping properties of the fiber-reinforced composite material. Here, hydrophobic silica refers to silica obtained by substituting the OH group on the surface of hydrophilic silica to any of the groups of $-(CH_2)_n-CH_3$, $[Si(CH_3)_2O]_m-Si(OCH_3)_3$, and $(CF_2)_p-CF_3$ (n=0-7, M=1-7, p=3-11). The following products can be mentioned, among others, as urethane particles having a three-dimensional cross-linked structure and coated with hydrophobic silica: "DAIMICBEAZ (registered trademark)" UCN-5070D and UCN-5150D (these products are manufactured by Dainichiseika Color & Chemicals Mfg. Co., Ltd.).

Furthermore, it is preferable that component (A) is spherical. If component (A) is spherical, the thicknesses of regions between reinforcement resin layers obtained from the prepreg of the present invention can be easily controlled on the basis of the average particle diameter and the mixing ratio of component (A).

It is preferable that the glass transition temperature of component (A) of the present invention does not exist within the range of −10° C. to 100° C. If the glass transition temperature exists in this range, products such as golf shafts, tennis rackets, fishing rods, or skis manufactured from the fiber-reinforced composite material obtained will suffer from changes in strength depending on use environments.

The first epoxy resin composition in component (B) is not subject to particular restrictions, provided that it is an epoxy resin composition. Said composition comprises an epoxy resin and a curing agent, and can contain a curing catalyst or the like, as necessary.

Examples of said epoxy resin for component (B) include bisphenol type epoxy resin, amine type epoxy resin, phenol novolac type epoxy resin, cresol novolac type epoxy resin, resorcinol type epoxy resin, phenol aralkyl type epoxy resin, dicyclopentadiene type epoxy resin, epoxy resin having a biphenyl skelton, urethane-modified epoxy resin, and isocyanate-modified epoxy resin. One or more thereof may be selected and used.

Here, a bisphenol type epoxy resin as referred to here is one which is formed by glycidylizing two phenolic hydroxyl groups of a bisphenol compound. Examples include bisphenol A type epoxy resin, bisphenol F type epoxy resin, bisphenol AD type epoxy resin, and bisphenol S type epoxy resin; and halogen substituents, alkyl substituents, or hydrogenerated substances thereof. Furthermore, not only monomers but also polymeric substances having a plurality of repeat units may be used suitably.

Examples of commercial products of bisphenol A type epoxy resin include "jER (registered trademark)" 825, "jER (registered trademark)" 828, "jER (registered trademark)" 834, "jER (registered trademark)" 1001, "jER (registered trademark)" 1002, "jER (registered trademark)" 1003, "jER (registered trademark)" 1003F, "jER (registered trademark)" 1004, "jER (registered trademark)" 1004AF, "jER (registered trademark)" 1005F, "jER (registered trademark)" 1006FS, "jER (registered trademark)" 1007, "jER (registered trademark)" 1009, and "jER (registered trademark)" 1010 (these products are manufactured by Mitsubishi Chemical Corporation). Examples of brominated bisphenol A type epoxy resin products include "jER (registered trademark)" 505, "jER (registered trademark)" 5050, "jER (registered trademark)" 5051, "jER (registered trademark)" 5054, and "jER (registered trademark)" 5057 (these products are manufactured by Mitsubishi Chemical Corporation). Examples of commercial products of hydrogenerated bisphenol A type epoxy resin include ST5080, ST4000D, ST4100D, and ST5100 (these products are manufactured by Nippon Steel Chemical Co., Ltd.).

Examples of commercial products of bisphenol F type epoxy resin include "jER (registered trademark)" 806, "jER (registered trademark)" 807, "jER (registered trademark)" 4002P, "jER (registered trademark)" 4004P, "jER (registered trademark)" 4007P, "jER (registered trademark)" 4009P, and "jER (registered trademark)" 4010P, (these products are manufactured by Mitsubishi Chemical Corporation); and "EPOTOHTO (registered trademark)" YDF2001 and "EPOTOHTO (registered trademark)" YDF2004 (these products are manufactured by Nippon Steel Chemical Co., Ltd.). Examples of tetramethylbisphenol F type epoxy products include YSLV-80XY (manufactured by Nippon Steel Chemical Co., Ltd.).

Examples of said bisphenol F type epoxy resin include "EPICLON (registered trademark)" EXA-154 (manufactured by DIC Corporation).

Particularly, a bisphenol A type epoxy resin or a bisphenol F type epoxy resin is preferable, since the balance among the modulus, the toughness, and the heat resistance properties is satisfactory.

Examples of amine type epoxy resin include tetraglycidyl diaminodiphenyl methane, triglycidyl aminophenyl, triglycidyl aminocresol, and tetraglycidyl xylylene diamine; and halogen substituents, alkynol substituents, and hydrogenerated substances of these epoxy resins.

Examples of said tetraglycidyl diaminodiphenyl methane include "SUMIEPDXY (registered trademark)" ELM434 (manufactured by Sumitomo Chemical Co., Ltd.); YH434L (manufactured by Nippon Steel Chemical Co., Ltd.); "jER (registered trademark)" 604 (manufactured by Mitsubishi Chemical Corporation); and "ARALDITE (registered trademark)" MY720 and MY721 (these products are manufactured by Huntsman Advanced Materials Co., Ltd.). Examples of triglycidyl aminophenol and triglycidyl aminocresol include "SUMIEPDXY (registered trademark)" ELM100 (manufactured by Sumitomo Chemical Co., Ltd.); "ARALDITE (registered trademark)" MY0500, MY0510, and MY0600 (these products are manufactured by Huntsman Advanced Materials Co., Ltd.); and "jER (registered trademark)" 630 (manufactured by Mitsubishi Chemical Corporation). Examples of tetraglycidyl xylylene diamine and hydrogenated substance thereof include TETRAD-X and TETRAD-C (these products are manufactured by Mitsubishi Gas Chemical Company, INC.).

Examples of commercial products of phenol novolac type epoxy resin include "jER (registered trademark)" 152 and "jER (registered trademark)" 154 (these products are manufactured by Mitsubishi Chemical Corporation); and "EPICLON (registered trademark)" N-740, N-770, and N-775 (these products are manufactured by DIC Corporation).

Examples of commercial products of cresol novolac type epoxy resin include "EPICLON (registered trademark)" N-660, N-665, N-670, N-673 and N-695 (these products are manufactured by DIC Corporation); EOCN-1020, EOCN-102S, and EOCN-104S (these products are manufactured by Nippon Kayaku Co., Ltd.)

Examples of resorcinol type epoxy resin include "DENACOL (registered trademark)" EX-201 (manufactured by Nagase Chemtex Corporation).

Examples of commercial products of dicyclopentadiene type epoxy resin include "EPICLON (registered trademark)" HP-7200, HP-7200L, HP-7200H, and HP-7200HH (these products are manufactured by DIC Corporation); Tactix (registered trademark)" 558 (manufactured by Huntsman Advanced Materials Co., Ltd.); and XD-1000-1L and XD-1000-2L (these products are manufactured by Nippon Kayaku Co., Ltd.).

Examples of commercial products of epoxy resin having a biphenyl skelton include "jER (registered trademark)" YX4000H, YX4000, and YL6616 (these products are manufactured by Mitsubishi Chemical Corporation); and NC-3000 (manufactured by Nippon Kayaku Co., Ltd.).

Examples of commercial products of urethane-modified epoxy resin and isocyanate-modified epoxy resin include AER 4152 (manufactured by Asahi Kasei Epoxy Corporation) and ACR 1348 (manufactured by Adeka Corporation) which have oxazolidone ring.

Furthermore, an epoxy resin having an epoxy equivalent of 800-5,500 is preferred because it increases the adhesiveness to urethane particles, thereby providing excellent vibration damping properties. More preferable is an epoxy resin having an epoxy equivalent of 800-2,500. If the epoxy equivalent is lower than 800, the adhesiveness improvement effect will not be sufficient. If the epoxy equivalent is higher than 5,500, the viscosity of the epoxy resin composition obtained will be too high, possibly making it difficult to produce a prepreg. A bisphenol type epoxy resin having an epoxy equivalent of 800-5,500 is more preferable in terms of the balance between the vibration damping properties and the toughness. Still more preferable are bisphenol A type epoxy resin and a bisphenol F type epoxy resin having an epoxy equivalent of 800-5,500.

The curing agent for component (B) is not subject to particular restrictions. However, dicyandiamide, its derivatives, and diaminodiphenyl sulfone are preferably used, since preservation stability is high. Other useful substances include amines such as aromatic amine and alicyclic amine; acid anhydrides; polyaminoamides; organic acid hydrazides; and isocyanates.

Examples of commercial products dicyandiamide include DICY-7 and DICY-15 (these products are manufactured by Mitsubishi Chemical Corporation).

Furthermore, as for the total quantity of a curing agent, it is preferable that the curing agent used contains an active hydrogen group in the range of 0.6 to 1.0 equivalent, more preferably in the range of 0.7 to 0.9 equivalent, relative to one equivalent of the epoxy group contained in the entire epoxy resin component. Here, the active hydrogen group means a functional group which is capable of reacting with an epoxy group in the curing agent component. If the active hydrogen group accounts for less than 0.6 equivalent, the resulting cured resin may be poor in reaction rate, heat resistance properties, and modulus, and the fiber-reinforced composite material may decrease in glass transition temperature and strength. Furthermore, if the active hydrogen group accounts for more than 1.0 equivalent, the cured resin will decrease in plastic deformation capacity, although it may have a sufficiently high reaction rate, glass transition temperature, and modulus. Accordingly, the fiber-reinforced composite material may have poor shock resistance.

A curing catalyst for component (B) may be used as well. The following substances can be used as curing catalyst: urea compounds; tertiary amines and salts thereof; imidazoles and salts thereof; and Lewis acids and Broensted acids, as well as salts thereof. Particularly, urea compounds are preferably used due to the balance between the preservation stability and the catalytic activity.

For example, the following substances can be used as said urea compounds:
N,N-dimethyl-N'-(3,4-dichlorophenyl)urea, toluene bis (dimethylurea), 4,4'-methylene bis(phenyl dimethyl urea), and 3-phenyl-1,1-dimethylurea. Useful commercial products of urea compounds include DCMU-99 (manufactured by Hodogaya Chemical Co., Ltd.); and Omicure 24, Omicure 52, and Omicure 94 (these products are manufactured by Emerald Performance Materials LLC).

Said urea compounds preferably account for 1 to 3 parts by mass, more preferably 1.5 to 3 parts by mass, per 100 parts by mass of the entire epoxy resin component. If the content of the urea compounds is less than 1 part by mass, reaction may not progress sufficiently, with the result that the modulus and the heat resistance properties of the cured resin can decrease. Furthermore, if the content of the urea compounds exceeds 3 parts by mass, self-polymerization reaction of the epoxy resin may hinder the reaction between the epoxy resin and the curing agent, with the result that the toughness of the cured resin may decrease or that the modulus thereof can reduce.

It is preferable that cured component (B) has a glass transition temperature of 100° C. or more. If the glass transition temperature of the cured resin is less than 100° C., warps or distortions may take place during molding of the fiber-reinforced composite material, and also deformations may be caused during use in a high temperature environment. Component (B) can be cured, for example, by heating it at 130° C. for 90 minutes.

Furthermore, a thermoplastic resin other than component (A) may be added to component (B) to the extent that the effects of the present invention are not lost. As for such a thermoplastic resin, it is possible to add a thermoplastic resin soluble in an epoxy resin, or organic particles such as rubber particles and thermoplastic resin particles. Preferable examples of said thermoplastic resin soluble in an epoxy resin include a thermoplastic resin having a hydrogen bond forming functional group that can be expected to effectively improve adhesiveness between resin and reinforcing fiber. The following are examples of thermoplastic resins which are soluble in epoxy resins and have hydrogen bond forming functional groups: thermoplastic resin having an alcoholic hydroxyl group, thermoplastic resin having an amide bond, and thermoplastic resin having a sulfonyl group.

The following are useful thermoplastic resins having alcoholic hydroxyl groups: polyvinyl acetal resins such as polyvinyl formal and polyvinyl butyral; polyvinyl alcohol; and phenoxy resin. The following are useful thermoplastic resins having an amide bond: polyamide, polyimide, and polyvinyl pyrrolidone. Polysulfone can be mentioned as a thermoplastic resin having a sulfonyl group. Said polyamide, polyimide, and polysulfone may have an ether bond and functional groups such as carbonyl group in their backbone chain. Said polyamide may have a substituent group on a nitrogen atom in the amide group.

Examples of commercial products of thermoplastic resins which are soluble in epoxy resins and have hydrogen bond forming functional groups include Denka Butyral and "Denka Formal (registered trademark)" (manufactured by Denki Kagaku Kogyo Kabushiki Kaisha), and "Vinylec (registered trademark)" (manufactured by Chisso Corporation), all of which are polyvinyl acetal resins; "UCAR (registered trademark)" PKHP (manufactured by Union Carbide Corporation), which is a phenoxy resin; "Macromelt (registered trademark)" (manufactured by Henkel Japan Limited) and "Amilan (registered trademark)" CM 4000 (manufactured by Toray Industries, Inc.), both of which are polyamide resins; "Ultem (registered trademark)" (manufactured by General Electric Company) and "Matrimid (registered trademark)" 5218 (manufactured by Ciba), both of which are polyimides; "Sumika Excel (registered trademark)" (manufactured by Sumitomo Chemical Co., Ltd.) and "UDEL (registered trademark)" (manufactured by Solvay Advanced Polymers K. K.), both of which are polysulfones; and "Rubiscol (registered trademark)" (manufactured by BASF Japan Ltd.), which is polyvinyl pyrrolidone.

Furthermore, acrylic resins are highly compatible with epoxy resins, and preferably used for viscoelasticity control. Examples of commercial products of acrylic resins include "Dianal (registered trademark)" BR series (manufactured by Mitsubishi Rayon Co., Ltd.); "Matsumoto Microsphere (registered trademark)" M, M 100 and M 500 (manufactured by Matsumoto Yushi-Seiyaku Co., Ltd.); and "Nanostrength (registered trademark)" E40F, M22N and M52N (manufactured by Arkema).

It is also possible to mix rubber particles. From the viewpoint of handling quality etc., preferable examples of said rubber particles include cross-linked rubber particles; and core shell rubber particles formed by graft-polymerizing dissimilar polymers on the surfaces of cross-linked rubber particles.

Commercial products of cross-linked rubber particles include FX501P formed of a cross-linked product made of a carboxyl-modified butadiene-acrylonitrile copolymer (manufactured by JSR Corporation), CX-MN series formed of acrylic rubber particulates (manufactured by Nippon Shokubai Co., Ltd.), and YR-500 series (manufactured by Nippon Steel Chemical Co., Ltd.)

Commercial products of core shell rubber particles include "Paraloid (registered trademark)" EXL-2655 (manufactured by Kureha Chemical Industry Co., Ltd.) formed of butadiene/alkyl methacrylate/styrene copolymer; "Staphyloid (registered trademark)" AC-3355 and TR-2122 (these products are manufactured by Takeda Chemical Industries, Ltd.) both of which are formed of an acrylic ester/methacrylic ester copolymer; "Paraloid (registered trademark)" EXL-2611 and EXL-3387 (manufactured by Rohm & Haas Company) formed of an butyl acrylate/methyl methacrylate copolymer; and "Kaneace (registered trademark)" MX series (manufactured by Kaneka Corporation).

Polyamide particles and polyimide particles are preferably used as said thermoplastic resin particles. Commercial products of said polyamide particles include SP-500 (manufactured by Toray Industries, Inc.) and "Orgasaol (registered trademark)" (manufactured by Arkema).

Reinforcing fibers are used as component (C). Reinforcing fibers are not subject to particular restrictions. Materials commonly used include glass fibers, carbon fibers, aramid fibers, boron fibers, alumina fibers, and silicon carbide fibers. Two or more of these fibers may be mixed and used. Among these types of fibers, it is preferable to use carbon fibers, from which a light-weight and high-rigidity fiber-reinforced composite material can be obtained.

Among other carbon fibers, those carbon fibers whose tensile modulus is 230-450 GPa are preferable, since not only can a light-weight and high-rigidity fiber-reinforced composite material be obtained, but also good vibration damping properties can be achieved. If the tensile modulus is less than 230 GPa, the rigidity and the vibration damping properties of the fiber-reinforced composite material obtained tend to decrease. Furthermore, if the tensile modulus exceeds 450 GPa, the adhesion properties are liable to be reduced and the strength may decrease, although energy conversion caused by the friction heat between carbon fibers and epoxy resin can work to improve the vibration damping properties of the fiber-reinforced composite material. In view of the balance between the dynamic properties and the vibration damping properties of the resulting fiber-reinforced composite material, carbon fibers with a tensile modulus of 230-300 GP are more preferably used.

The constitution of reinforcing fibers is not subject to particular restrictions. Useful examples include long fibers pulled and aligned in one direction, tow, fabrics, mats, knits, braids, and short fibers chopped to a length less than 10 mm. Long fibers as mentioned here refer to substantially continuous single fibers or fiber bundles which are 10 mm or more in length. Furthermore, short fibers refer to fiber bundles which are cut to a length less than 10 mm. For applications particularly requiring high specific strength and specific modulus, fabrics comprising reinforcing fiber bundles pulled and aligned in one direction are most suitable. A cloth-like (fabric-like) arrangement is also suitable for the present invention from the viewpoint of easy handling.

Figure 3:
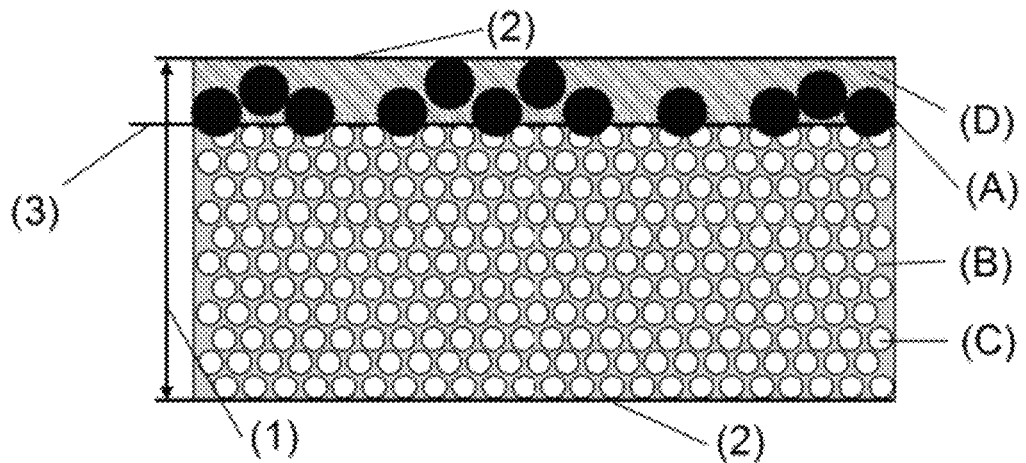
Figure 4:
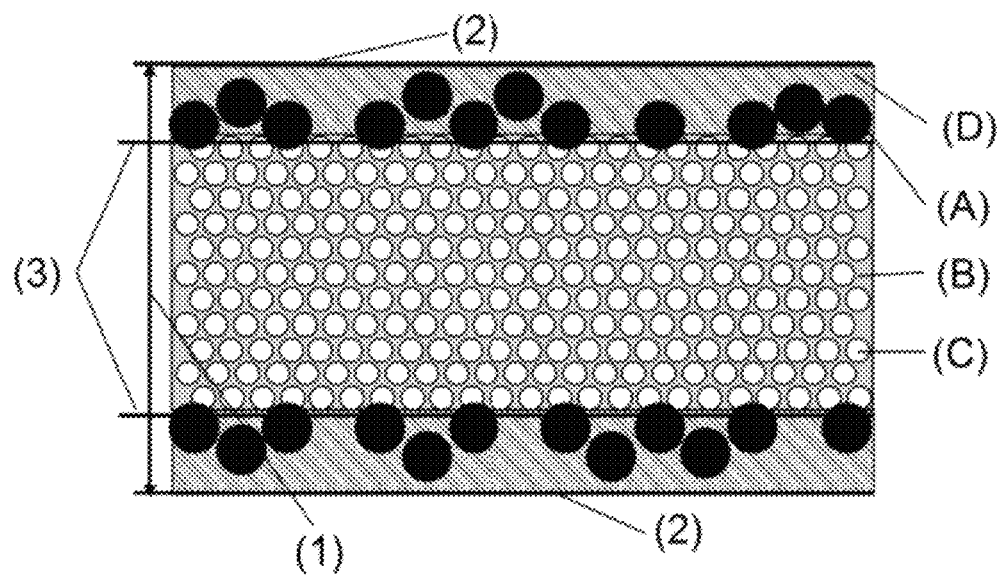

It is preferable that as shown in FIG. 3 or FIG. 4, the prepreg of the present invention further comprises component (D), that component (D) is placed on one surface or both surfaces of a layer formed of components (B) and (C), and furthermore, that component (A) is contained in component (D). Component (D) is a second epoxy resin composition which is not compatible with component (A). Containing component (A) in component (D) makes it possible to prevent voids from being produced when laminating and curing these prepreg layers to form fiber-reinforced composite material. Component (D) is not subject to particular restrictions, provided that it is an epoxy resin composition. It comprises an epoxy resin and a curing agent, and may contain a curing catalyst etc., as necessary. For component (D), the epoxy resin, curing agent, curing catalyst, etc., mentioned above for component (B) can be applied. Furthermore, component (D) (second epoxy resin composition) may be different from component (B) (first epoxy resin composition), but they are preferably the same. "being the same" as referred to herein means that the types of the epoxy resin, curing agent, and curing catalyst which constitute component (B) are the same as those of component (D), and that the difference in the content of each component is 5% or less by mass.

It is preferable that the glass transition temperature of the cured resin of component (D) is also 100° C. or more. If it is less than 100° C., warps or distortions can take place during molding of the fiber-reinforced composite material, and deformations can also be caused during use in a high temperature environment. Component (D) can be cured, for example, by heating it at 130° C. for 90 minutes.

The method for producing the prepreg of the present invention is not subject to particular restrictions, and it can be suitably produced by either of the following methods (1) and (2).

(1) A prepreg production method containing a step of impregnating component (C) with component (B), thereby preparing a prepreg precursor and a step of sticking component (A) to the prepreg precursor.

(2) A prepreg production method containing the following steps (I) to (III):

(I) a step of dispersing component (A) in component (D), and forming a film from them, (II) a step of impregnating component (C) with component (B) to prepare a prepreg precursor, and (III) a step of sticking the film resulting from (I) to the prepreg precursor resulting from (II).

The methods for impregnating component (C) with component (B) include the wet method in which an epoxy resin composition is dissolved in a solvent such as methyl ethyl ketone and methanol to decrease the viscosity, followed by impregnation, and the hot-melt method (dry method) in which its viscosity is reduced by heating, followed by impregnation.

In a wet process, reinforcing fibers are immersed in a solution of an epoxy resin composition, and after pulling them out, the solvent is evaporated in an oven or the like. In a hot-melt process, a fiber substrate formed of reinforcing fibers is directly impregnated with an epoxy resin composition whose viscosity is reduced by heating, or a film is first prepared by coating release paper with an epoxy resin composition, followed by putting said film on one side or both sides of said fiber substrate formed of reinforcing fibers and applying heat and pressure to impregnate said fiber substrate formed of said reinforcing fibers with resin. The use of the hot-melt method is preferable because the resulting prepreg is virtually free from solvent residues.

It is preferable that the prepreg precursor obtained by impregnating component (C) with component (B) has a reinforcing fiber density per unit area of 50-200 g/m$^2$. If the quantity of reinforcing fibers is 50 g/m$^2$ or less, it is necessary to increase the number of layers laminated, in order to achieve a predetermined thickness when molding the fiber-reinforced material, possibly requiring complicated operations. If the quantity of reinforcing fibers exceeds 200 g/m$^2$, on the other hand, the draping quality of the resulting prepreg tends to be poor. Furthermore, the fiber's mass content is preferably 60-90% by mass, more preferably 65-85% by mass, and still more preferably 70-80% by mass. If the fiber's mass content is less than 60% by mass, the amount of resin would be so large that it is impossible to obtain the advantages of fiber-reinforced composite materials such as high specific strength and specific modulus, and heat generation during heating would be too large when preparing fiber-reinforced composite material. If the fiber's mass content exceeds 90% by mass, furthermore, deficient resin impregnation can occur, resulting in fiber-reinforced composite material containing many voids.

The methods available for sticking component (A) to the prepreg precursor include using a sprayer to spray component (A) on the prepreg precursor; spraying component (A) on the prepreg precursor, followed by passing said prepreg precursor through a gap of a predetermined size; spraying component (A) on a sheet of release paper or a release film using a spray device, followed by pressing said release paper or release film against the prepreg precursor to combine them into one body; first dispersing component (A) in a liquid that does not dissolve component (A), then applying the resulting dispersion liquid to the prepreg precursor, and removing the liquid by drying; and stocking component (A) to the prepreg precursor using static electricity.

A preferred process for dispersing component (A) in component (D) is to knead component (A) and component (D) using a device such as kneader, triple roll mill, bead mill, planetary mixer, and twin-screw extruder.

A useful process for preparing a film from a resin composition comprising component (D) and component (A) dispersed therein is to coat release paper or the like with the resin composition to provide a film.

Figure 5:
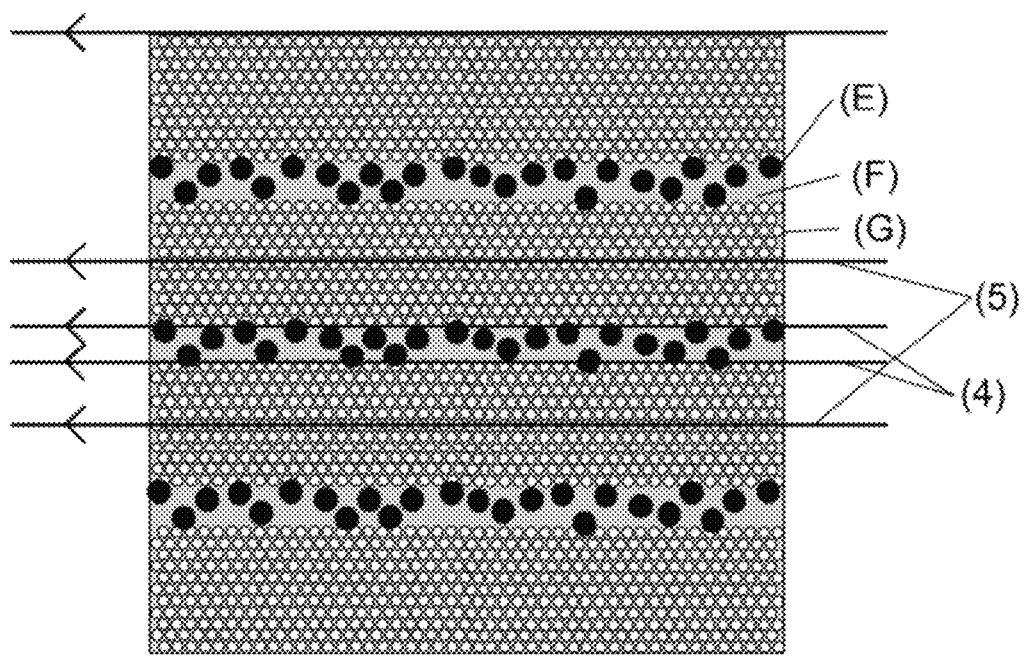
Figure 6:
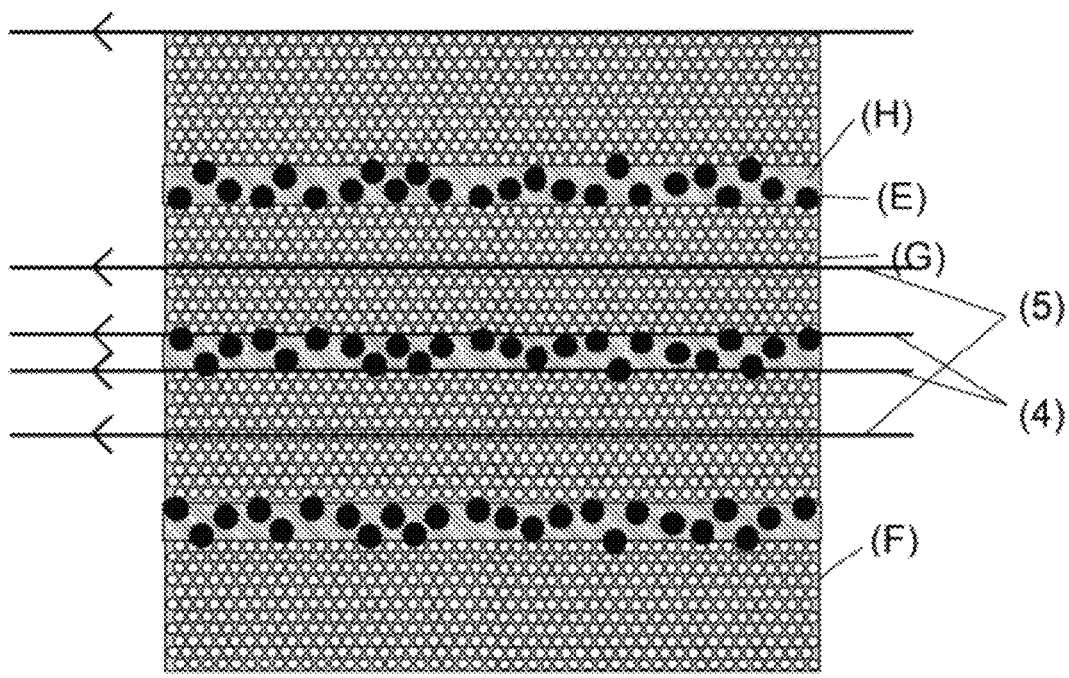

In the next place, the fiber-reinforced composite material of the present invention will be described. Said fiber-reinforced composite material of the present invention is a fiber-reinforced composite material containing components (E) to (G) defined below in which 90% or more by area, as measured in a cross section, of component (E) is localized in an interlayer region. Cross-sections of preferable embodiments of said fiber-reinforced composite material are shown in FIG. 5 and FIG. 6.

(E) urethane particles having tan δ at 10° C. of 0.15 or more and having a three-dimensional cross-linked structure.

(F) a cured resin of a third epoxy resin composition.

(G) reinforcing fiber.

It is necessary that component (E) to be used for the present invention be urethane particles having a three-dimensional cross-linked structure. The use of urethane particles having a three-dimensional cross-linked structure makes it incompatible with said third epoxy resin composition and serves to provide a fiber-reinforced composite material having excellent rigidity, strength, and vibration damping properties. If the urethane particles do not have a three-dimensional cross-linked structure, they will be liable dissolve in the third epoxy resin composition before curing. If the urethane particles are dissolved in the third epoxy resin composition, not only the fiber-reinforced composite will be low in rigidity, strength, and glass transition temperature, but also the effect of vibration damping properties will be insufficient.

The fact that component (E) is incompatible with the third epoxy resin composition can be confirmed from the glass transition temperature that is determined from a storage modulus curve based on dynamic viscoelasticity measurements of a cured resin composition consisting of component (E) and the third epoxy resin composition. That is, dynamic viscoelasticity measurements are used to determine the glass transition temperatures of the following items: a cured resin composition obtained by curing a resin composition consisting of component (E) and the third epoxy resin composition; a plate-like molded product formed only of component (E); and a cured resin obtained by curing the third epoxy resin composition only. If component (E) and the third epoxy resin composition are incompatible with each other, a resin composition consisting of component (E) and the third epoxy resin composition gives glass transition temperatures at the same temperatures as the glass transition temperature of a plate-like molded product formed of component (E) only and that of a cured resin obtained by curing the third epoxy resin composition only. Here, being the same temperature means that the difference in glass transition temperature is in the range of −3 to 3° C.

Said cured resin composition consisting of component (E) and the third epoxy resin composition, said plate-like composition formed of component (E), and said cured resin of the third epoxy resin composition only can be produced by the same procedures as for said cured resin composition comprising component (A) and component (B), said plate-like composition formed of component (A), and said cured resin of component (B) only. Furthermore, their glass transition temperature can be determined by subjecting the plate-like cured resin composition and the plate-like composition prepared by the methods mentioned above to dynamic viscoelasticity measurement by the method mentioned above.

Furthermore, it is necessary that tan δ of component (E) at 10° C. is 0.15 or more, more preferably 0.2 or more. If tan δ is lower than 0.15, vibration damping properties are not sufficient. Here, tan δ at 10° C. can be determined by subjecting the plate-like cured resin composition prepared by the method mentioned above to dynamic viscoelasticity measurement by the method mentioned above.

It is preferable that the percentage of component (E) contained in a fiber-reinforced composite material is 2 to 20% by mass, more preferably 2 to 10% by mass. If the content is less than 2% by mass, there is a tendency that while the rigidity and the strength of the fiber-reinforced composite obtained are high, the vibration damping properties deteriorate. Meanwhile, if the content exceeds 20% by mass, there is a tendency that while the vibration damping properties of the fiber-reinforced composite material obtained are good, the rigidity and the strength tend to be excessively reduced.

The examples given for component (A) can be used as component (E).

In an observed cross section of the fiber-reinforced composite material of the present invention, it is necessary that 90% or more by area of component (E) be localized in the interlayer regions. In other words, on the assumption that the area of the entire component (E) contained in the fiber-reinforced composite material accounts for 100%, it is necessary that 90% or more by area of component (E) exist in the interlayer region. Here, an interlayer region is defined as the reinforcing fiber-free region existing between one reinforcing fiber layer and another reinforcing fiber layer located adjacent to the former in a fiber-reinforced composite material. If the percentage of component (E) present in the interlayer regions is less than 90% by area, then urethane particles, whose modulus is lower than that of component (F), enters the interior of reinforcing fiber bundles, resulting in a reduction in the modulus of the matrix resin in the fiber-reinforced material. As a consequence, not only are rigidity and strength reduced, but also vibration damping property improvement effect decrease.

Here, the degree of localization of particles in the fiber-reinforced material can be evaluated as follows. First, a cross section of a fiber-reinforced material is photographed at a magnification of 200 or more (see FIG. 5 or FIG. 6). In this photograph, an averaged borderline (4) is drawn between a layer comprising components (F) and (G) and a layer where component (G) is not present. Here, the averaged borderline is drawing as follows. First, five or more points are selected on a borderline between a layer comprising components (F) and (G) and a layer where component (G) is not present. With respect to the method for selecting such points, five or more places may be selected arbitrarily in the case where the fiber-reinforced composite material is a laminated sheet. However, if the fiber-reinforced composite material has a cylindrical shape or a complicated shape, it is preferable to select such points at smaller intervals to reflect such shapes effectively. For example, in the case of a cylindrical shape, it is preferable to select a total of six points at 60-degree or less intervals, starting at an arbitrary point. In the next place, either one of the surfaces of the fiber-reinforced composite material is taken as a reference line, and the distance from the reference line to each of said five or more points selected above is measured. Then, the average of these distances is calculated. A line is drawn parallel to said reference and away from said reference line by a distance equal to the average calculated above. The resulting line is called averaged borderline.

In the next place, an averaged center thickness line (5) is drawn in the layer comprising components (F) and (G). To draw an averaged center thickness line, first an averaged borderline is drawn for each of the surface of a layer comprising components (F) and (G) as stated above, and then a line is drawn at the center of the two averaged borderlines. Thus, averaged center thickness line is at the same distance from the two averaged borderlines (4) and parallel the two averaged borderlines.

For a layer free from component (G), the region located between the two averaged borderlines on either side of said layer is defined as an interlayer region. The sum of the cross-sectional areas of the particles present in an interlayer region is determined. Then, a region extending from the averaged center thickness line (5) of a layer which comprises components (F) and (G) and which is adjacent to a layer free from component (G) to the averaged center thickness line (5) of another layer which comprises components (F) and (G) and which is located on the other side of and adjacent to said layer free from component (G) is defined as the entire region to be covered by the measurement of the cross-sectional areas of particles. The sum of the cross-sectional areas of all particles present in this entire region is determined.

The ratio of the total cross-sectional areas of the particles present in the interlayer region thus determined to the total cross-sectional areas of the particles present in the entire region is determined to calculate the percentage of the particles present in the interlayer region, namely, the interlayer localization rate. The determination of the particle's cross-sectional areas may be performed using an image analyzer, or calculation may be made by cutting out all particle portions in a predetermined region from the cross-sectional photograph, and measuring the mass of the cut-out portions. For the purpose of eliminating the influence of partial scattering in the distribution of particles, this evaluation is performed for the entire width of the photograph, and evaluation is performed for photographs taken at five or more arbitrarily selected places, followed by averaging the results. When it is difficult to distinguish between particles and matrix resin, either of them is selectively stained and observed. The microscope to be used may be either an optical microscope or a scanning electron microscope. It is advisable to use either of them depending on particle size and the staining method used. In this regard, for the present invention, the ratio of particles present in an interlayer region is measured on the basis of area ratio. However, this procedure is substantially equivalent to measuring the mass ratio, since the mass ratio of particles is equal to their area ratio.

Component (F) is formed by curing the third epoxy resin composition. The third epoxy resin composition comprises an epoxy resin and a curing agent, and may contain a curing catalyst etc., as necessary. Examples of the epoxy resin, curing agent, curing catalyst, etc., given for said component (B) can also be used here.

Reinforcing fiber is used as component (G). Examples of the reinforcing fiber given for component (C) can also be used here.

It is preferable that as shown in FIG. 6, the fiber-reinforced composite material of the present invention further contains component (H), and that component (E) is contained in component (H). Component (H) is a cured resin of a fourth epoxy resin composition which is not compatible with component (E). Maintaining component (E) in the state of being contained in component (H) makes it possible to prevent voids from being formed during the laminating and curing steps for producing the fiber-reinforced composite material.

The fourth epoxy resin composition comprises an epoxy resin and a curing agent, and may contain a curing catalyst, as necessary. The examples of epoxy resin, curing agent, curing catalyst, etc., given for component (B) can also be used for component (B).

The method to be used for producing the fiber reinforced composite material of the present invention is not subject to particular restrictions, but useful ones include the prepreg lamination molding method, the resin transfer molding method, the resin film infusion method, the hand layup method, the sheet molding compound method, the filament winding method, and the pultrusion method. Particularly, the prepreg lamination molding method, which uses a prepreg of said present invention, is preferable, since said method can produce fiber reinforced composite materials with higher rigidity and strength.

The prepreg lamination molding method comprises shaping and/or laminating a prepreg and heat-curing the resin while applying a pressure to the shaped and/or laminated product. To apply heat and pressure, methods such as follows can be used: the press molding method, the autoclave molding method, the bagging molding method the wrapping tape method, and internal pressure molding method.

In the autoclave molding method, a prepreg is laminated on a tool plate having a predetermined shape and coated with a bagging film, followed by curing it by heating under pressure while deaerating the interior of a laminated product. The autoclave molding method can precisely control the fiber orientation and does not suffer from significant void formation, allowing high-quality moldings with good dynamic/static properties to be produced.

In the wrapping tape method, a prepreg is wound around a core bar such as mandrel to produce a tubular body of a reinforced composite material. The wrapping tape method is suitable to produce rod-like bodies such as golf club shafts, fishing rods, etc. More specifically, in this method, a prepreg is wound around a mandrel and a wrapping tape formed of a thermoplastic film is wound around the outside of the prepreg for the purpose of fixing the prepreg and applying pressure thereto, followed by heat-curing the resin in an oven and subsequently pulling out the core bar to produce a tubular body.

In the internal pressure molding method, a preform formed by winding a prepreg around an internally pressurizable body such as thermoplastic resin tube is set in a mold and pressure is applied by introducing high pressure gas into the internally pressurizable body while at the same time heating the mold to carry out molding. This method is preferably used to produce complicatedely shaped products such as golf club shafts, bats, and rackets for tennis and badminton.

The optimum curing temperatures and time for treating a fiber-reinforced composite material in an autoclave depend on type and quantity of the curing agent and curing catalyst selected. From the viewpoint of heat resistance properties of cured products, it is preferable to carry out curing for 0.5-8 hours at a temperature of 120-220° C. The heating rate is preferably in the range of 0.1-10° C./minute. If the heating rate is less than 0.1° C./minute, the time to reach the target curing temperature is exceedingly increased, resulting in reduced workability. Furthermore, if the heating rate exceeds 10° C./minute, temperature differences occur among different locations in the reinforcing fiber, possibly failing to produce a uniformly cured product.

When a fiber-reinforced composite material is molded, effects such as improvement in surface quality and prevention of internal voids can be easily achieved by applying increased or reduced pressure.

It is preferable that the loss factor of the fiber-reinforced composite material of the present invention is 130% or more of the loss factor of a fiber-reinforced composite material which is the same as said fiber-reinforced composite material except that component (E) is not contained. If it is less than 130%, the ball hitting feeling improvement effect and the elbow fatigue reduction effect tend to be smaller in golf club shafts, fishing rods, tennis rackets, etc., produced by molding it. Here, the expression "a fiber-reinforced composite material which is the same as said fiber-reinforced composite material except that component (F) is not contained" means a fiber-reinforced composite material prepared with the same composition under the same production conditions, except for not containing component (E), as those adopted for the fiber-reinforced composite material under analysis, and it is used as control sample in analysis of physical properties. Here, "the same composition" means that the difference in the content of each component is 5% or less by mass.

Furthermore, it is preferable that the flexural strength of the fiber-reinforced composite material of the present invention is 90% or more of the flexural strength of a fiber-reinforced composite material which is the same as said fiber-reinforced composite material except that component (E) is not contained. Here, "the flexural strength" refers to a value converted on the basis of a fiber content of 60% by volume. If the flexural strength is less than 90%, golf club shafts, fishing rods, tennis rackets, etc. produced by molding it will fail to have sufficient strength, or will have an increased weight if improved in strength.

Furthermore, it is preferable that the zero-degree modulus of the fiber-reinforced composite material of the present invention is 90% or more of the zero-degree modulus of a fiber-reinforced composite material which is the same as said fiber-reinforced composite material except that component (E) is not contained. If the zero-degree modulus is less than 90%, golf club shafts, fishing rods, tennis rackets, etc., produced by molding it will fail to have sufficient rigidity, or will have an increased weight if improved in rigidity.

Furthermore, it is preferable that the fiber-reinforced composite material of the present invention does not have a glass transition temperature in the range of 10-90° C. If it has a glass transition temperature in this range, deformation can occur during coating or polishing of the fiber-reinforced composite material.

A fiber-reinforced composite material formed by curing the prepreg of the present invention and the fiber-reinforced composite material of the present invention are suitably used in the fields of sports applications, general industrial applications, and aerospace applications. More specifically, said sports applications include golf club shafts, fishing rods, rackets for tennis and badminton, sticks for hockey etc., bicycle parts, bicycle frames, bicycle wheels, and ski poles.

Furthermore, said general industrial applications include structural members of automobiles, ships, railroad cars, other vehicles, drive shafts, leaf springs, windmill blades, pressure vessels, flywheels, papermaking rollers, roofing materials, cables, and repair and reinforcement materials.

EXAMPLES

The present invention will now be illustrated in greater detail with reference to Examples, but it should be understood that the invention is not construed as being limited thereto.

Components (A) to (E) used in Examples and Comparative examples are as follows.

(A-1): Three-dimensional cross-linked urethane particles coated with hydrophobic silica ("DAIMICBEAZ [registered trademark]" UCN-5150D manufactured by Dainichiseika Color & Chemicals Mfg. Co., Ltd.: average particle diameter 15 μm; tan δ at 10° C., 0.20; glass transition temperature −27° C.; spherical)

(A-2): Three-dimensional cross-linked urethane particles coated with hydrophobic silica ("DAIMICBEAZ [registered trademark]" UCN-5070D manufactured by Dainichiseika Color & Chemicals Mfg. Co., Ltd.: average particle diameter 7 μm; tan δ at 10° C., 0.20; glass transition temperature −27° C.; spherical)

(A-3): Three-dimensional cross-linked urethane particles ("Art Pearl [registered trademark]" JB-400T manufactured by Negami Chemical Industrial Co., Ltd.: average particle diameter 15 μm; tan δ at 10° C., 0.15; glass transition temperature −56° C., 73° C.; spherical)

(A-4): Urethane particles (formed by frost-shattering "Rezamin [registered trademark]" P-880 [manufactured by Dainichiseika Color & Chemicals Mfg. Co., Ltd.]: average particle diameter 18 μm; tan δ at 10° C., 0.43; glass transition temperature −26° C.; irregular shaped)

(A-5): Polypropylene particles (formed by freeze-crushing "Prime Polypro [registered trademark]" J105G [manufactured by Prime Polymer Co., Ltd.]: average particle diameter 13 μm; tan δ at 10° C., 0.07; glass transition temperature −3° C.; irregular shaped)

(A-6): Polypropylene particles (formed by freeze-crushing "Prime Polypro [registered trademark]" J105G [manufactured by Prime Polymer Co., Ltd.]: average particle diameter 3 μm; tan δ at 10° C., 0.07; glass transition temperature −3° C.; irregular shaped)

(A-7): Polypropylene particles (formed by freeze-crushing "Prime Polypro [registered trademark]" J105G [manufactured by Prime Polymer Co., Ltd.]: average particle diameter 40 μm; tan δ at 10° C., 0.07; glass transition temperature −3° C.; irregular shaped)

(A-8): Urethane film (formed by uniformly scattering resin pellets of Art Pearl [registered trademark]" JB-400T [manufactured by Negami Chemical Industrial Co., Ltd.], over a stainless steel plate carrying a 30 μm thick spacer, and press-molding the resin pellets for five minutes at 280° C. under a pressure of 50 kg/cm$^2$, film thickness 30 μm).

Similarly, components (B) and (D), the third epoxy resin, and the fourth epoxy resin are as follows.

<Epoxy Resins>

(B-1): Bisphenol A type epoxy resin ("jER [registered trademark]" 1001, manufactured by Mitsubishi Chemical Corporation: epoxy equivalent 475)

(B-2): Bisphenol A type epoxy resin ("jER [registered trademark]" 828, manufactured by Mitsubishi Chemical Corporation: epoxy equivalent 189)

(B-3): Bisphenol F type epoxy resin ("EPOTOHTO [registered trademark]" YDF2001, manufactured by Nippon Steel Chemical Co.: epoxy equivalent 475)

(B-4): Bisphenol F type epoxy resin ("jER [registered trademark]" 807; manufactured by Mitsubishi Chemical Corporation: epoxy equivalent 170)

(B-5): Bisphenol novolac type epoxy resin ("jER [registered trademark]" 154, manufactured by Mitsubishi Chemical Corporation: epoxy equivalent 178)

(B-6): Dicyclopentadiene type epoxy resin ("EPICLON [registered trademark]" HP7200H, manufactured by DIC Corporation: epoxy equivalent 283)

(B-7): Multifunctional amine type epoxy resin (SUMIEPDXY [registered trademark]" ELM434, manufactured by Sumitomo Chemical Co:, Ltd.: epoxy equivalent 120)

(B-8): Epoxy resin having a biphenyl backbone ("jER [registered trademark]" YX4000, manufactured by Mitsubishi Chemical Corporation: epoxy equivalent 186)

(B-9): Isocyanate-modified epoxy resin (AER 4152, manufactured by Asahi Kasei Epoxy Corporation: epoxy equivalent 340)

(B-10): Bisphenol A type epoxy resin "jER [registered trademark]" 1004FS, manufactured by Mitsubishi Chemical Corporation: epoxy equivalent 810)

(B-11): Bisphenol A type epoxy resin "jER [registered trademark]" 1007 manufactured by Mitsubishi Chemical Corporation: epoxy equivalent 1930)

(B-12): Bisphenol A type epoxy resin "jER [registered trademark]" 1010 manufactured by Mitsubishi Chemical Corporation: epoxy equivalent 4000)

(B-13): Bisphenol F type epoxy resin "jER [registered trademark]" 4004P, manufactured by Mitsubishi Chemical Corporation: epoxy equivalent 800)

(B-14): Bisphenol F type epoxy resin "jER [registered trademark]" 4007, manufactured by Mitsubishi Chemical Corporation: epoxy equivalent 2270)

(B-15): Bisphenol F type epoxy resin "jER [registered trademark]" 4010, manufactured by Mitsubishi Chemical Corporation: epoxy equivalent 4400)

<Curing Agents>

(B-16): Dicyandiamide (DICY7, manufactured by Mitsubishi Chemical Corporation: active hydrogen equivalent; 12)

(B-17): 4,4-diaminodiphenyl sulfone (Seikacure [registered trademark]" S, manufactured by Wakayama Seika Kogyo Co., Ltd.: active hydrogen equivalent; 62)

(B-18): Mixture of methylhexahydrophthalic anhydride/hexahydrophthalic anhydride=70/30 (by mass) ("Rikacid [registered trademark]" MH700, manufactured by New Japan Chemical Co., Ltd.: active hydrogen equivalent; 163)

<Curing Agents>

(B-19): Urea compound (DCMU-99, manufactured by Hodogaya Chemical Co., Ltd.)

(B-20): Triphenyl phosphine (TPP, manufactured by Hokko Chemical Industry Co., Ltd.)

Similarly, components (C) and (G) as follows.

<Reinforcing Fibers>

(C-1): Carbon fibers ("Torayca [registered trademark]" T700S, manufactured by Toray Industries, Inc.: tensile modulus; 230 GPa; tensile strength; 4,900 MPa)

(C-2): Carbon fiber fabric ("Torayca Cloth [registered trademark]" BT70-30, manufactured by Toray Industries, Inc.: Carbon fibers, "Torayca (registered trademark)" T700: woven texture, plain weave; mass per unit area, 300 g/m$^2$).

(C-3): Carbon fibers ("Torayca [registered trademark]" T800S, manufactured by Toray Industries, Inc.: tensile modulus; 294 GPa; tensile strength; 5,880 MPa)

(C-4): Carbon fibers ("Torayca [registered trademark]" M40J, manufactured by Toray Industries, Inc.: tensile modulus; 377 GPa; tensile strength; 4,400 MPa)

(C-5): Carbon fibers ("Torayca [registered trademark]" M46J, manufactured by Toray Industries, Inc.: tensile modulus; 436 GPa; tensile strength; 4,200 MPa)

(C-6): Carbon fibers ("Torayca [registered trademark]" M50J, manufactured by Toray Industries, Inc.: tensile modulus; 475 GPa; tensile strength; 4,120 MPa)

Similarly, raw materials other than the above are as follows:

Polyvinyl formal ("Vinylec [registered trademark]" E, manufactured by Chisso Corporation)

S-B-M copolymer (Nanostrength "[registered trademark]" E40F, manufactured by Arkema, S representing styrene, B representing 1,4-butadiene, M representing methyl methacrylate)

Polyether ester sulfone (Sumika Excel "[registered trademark]" PES5003P, manufactured by Sumitomo Chemical Co., Ltd.)

(1) Method for Producing Particles by Freeze-Crushing

Resin pellets were freeze-crushed using a pulverizing machine (Pulverizer manufactured by Hosokawa Micron Corporation) while cooling the resin pellets down to the glass transition temperature using dry ice.

(2) Method for Measuring Volume Mean Particle Diameters

Volume mean particle diameters were measured by the laser diffraction/scattering method using LMS-24 (manufactured by Seishin Enterprise Co., Ltd.) in accordance with JIS K5600-9-3 (2006).

(3) Method for Preparing Plate-Like Molding Formed of Component (A)

A component (A) was placed in a 2 mm thick stainless steel mold and was press-molded for 5 minutes at a pressure of 50 kg/cm$^2$. Molding temperatures for various resins are shown below.

"DAIMICBEAZ (registered trademark)" UCN-5070 and 5150D; and "Art Pearl (registered trademark)" JB-400T: 280° C.

"Rezamin (registered trademark)" P-880: 180° C.

"Prime Polypro (registered trademark):" J105G: 230° C.

(4) Method for Preparing Plate-Like Molding Farmed of Component (B)

A component (B) was defoamed in a vacuum. Subsequently, the component (B) was injected into a mold which was so set that the thickness would become 2 mm using a 2 mm thick "Teflon (registered trademark)" spacer. Then the component (B) was completely cured under the conditions described in each Reference example.

(5) Method for Preparing Plate-Like Molding Formed of Components (A) and (B)

The components (A) and (B) were kneaded together. Subsequently, the resin composition obtained was defoamed in a vacuum, and thereafter injected into a mold which was so set that the thickness would become 2 mm using a 2 mm thick "Teflon (registered trademark)" spacer. Then the component (B) was completely cured under the same conditions as those in item (4) above.

(6) Method for Measuring Glass Transition Temperature and Tan δ at 0° C. of Cured Resin or Plate-Like Molding A cured resin or a plate-like molding was cut with a diamond cutter to a size 13 mm wide and 35 mm long. A dynamic viscoelasticity measuring device (DMAQ800: Manufactured by TA Instruments, Inc.) was used to heat such a sample to −70° C. to 250° C. at a temperature rise rate of 5° C./min. Then measurements of the storage modulus and tan δ were made in a bending mode with a frequency of 1.0 Hz. The onset temperature of the storage modulus at this time was taken as the glass transition temperature (7) Method for Confirming Cured State of Cured Resin A sample with a weight of approximately 10 mg was cut out at an arbitrary place in a cured resin. A differential scanning calorimetric device (DSC2920: Manufactured by TA Instruments, Inc.) was used to heat such a sample from room temperature to 350° C. at a temperature rise rate of 10° C./min. If no exothermic peak was found, it was decided that complete curing was achieved.

(8) Method for Measuring Particle Distribution State in Prepreg

A prepreg was held between two smooth "Teflon (registered trademark)" resin plates, and brought into close contact therewith. Then the temperature was increased at a temperature rise rate of 2° C./h to the maximum temperature stated in each Example and Comparative example to ensure gelation and curing. The obtained cured product formed of the prepreg was cut with a sharp cutter in a direction perpendicular to the surfaces that are in close contact with the "Teflon (registered trademark)" resin plates. In this regard, in a case where the cut surface was not smooth, the cut surface was polished. The cut surface was enlarged to 200 magnifications or more using an optical micrometer. By holding the cured product so that its upper and lower surfaces would be held within the field of view, a photograph was taken. In the next place, thicknesses at arbitrary five places were measured in the photograph taken. The average of these thicknesses was taken as the average prepreg thickness.

With respect to both surfaces of such a cured product, two lines parallel to these surfaces of the cured product were drawn at a depth corresponding to 20% of the thickness. In the next place, the total area of the particles present between each surface of the cured product and each line drawn at a depth corresponding to 20% of the thickness, and the total area of all particles present across the entire measured thickness of the cured product were measured. The ratio (surface localization rate) of the total area of the particles present in the regions extending from the surfaces to a depth corresponding to 20% of the thickness of the cured product relative to the total area of all particles was calculated. The total area of such particles was determined by cutting out particle portions from a cross-sectional photograph, and making calculations from their mass. Such measurements were made by arbitrarily selecting five places from the cured product formed of the prepreg. Then the average value was calculated. In cases where it was difficult, in a photograph taken, to distinguish particles dispersed in the matrix resin, the particles were stained.

(9) Method for Measuring Particle Distribution State in Fiber-Reinforced Composite Material A fiber-reinforced composite material was cut using a diamond cutter in a direction perpendicular to the surface. In cases where the cut surface of the cured product was not smooth, the cut surface was polished.

Such a cross-sectional surface was enlarged to 200 magnifications or more using an optical microscope. Moreover, photographs were taken so that at least either one of the surfaces would be held within the field of view. These photographs were used as follows. In accordance with the technique for measuring particle distribution states in fiber-reinforced composite materials described previously, five places were arbitrarily selected from each photograph, and averaged borderlines and average center thickness lines were drawn. In accordance with the technique for measuring particle distribution states in fiber-reinforced composite materials described previously, particle portions were cut out from the cross-sectional photograph, and the ratio (interlayer localization rate) of the total cross-sectional areas of the particles present in the interlayer regions to the total cross-sectional areas of the particles present in all the regions was determined. In cases where it was difficult, in a photograph taken, to distinguish particles dispersed in the matrix resin, the particles were stained.

(10) Method for Measuring Loss Factor of Fiber-Reinforced Composite Material

By using a diamond cutter, a sample 10 mm wide and 200 mm long was cut out from a fiber-reinforced composite material. Here, in the case of a unidirectional material, a sample was cut out so that the longitudinal direction thereof would be parallel to fibers, and in the case of a fabric material, a sample was cut out so that fibers in either direction would be parallel to the longitudinal direction. That portion of such a sample which extends from one longitudinal end to a position 35 mm away therefrom was held with a clamp, and the sample was deflected downward by 3 cm at a position of 195 mm. Vibrations generated when this deflection was released were measured with a strain gauge attached at a position of 50 mm. The loss factor was determined from the waveform obtained.

(11) Method for Measuring Flexural Modulus and Flexural Strength of Fiber-Reinforced Composite Material To represent the flexural strength, measurements were made of zero-degree flexural strength and 90-degree flexural strength in the case of a unidirectional material, and measurements were made of flexural strength in a direction parallel to either one of the fiber directions in the case of a fabric material. The 90-degree flexural strength of the unidirectional material and the flexural strength of the fabric material were measured as follows. A sample of fiber-reinforced composite material was cut out to a thickness, width, and length of 2 mm, 15 mm, and 60 mm, respectively. Measurements were made using an Instron Universal Testing Machine (manufactured by Instron Corporation) under the conditions of a crosshead speed of 1.0 mm/min, support point span of 40 mm, indenter diameter of 10 mm, and support point diameter of 4 mm. Then the flexural strength was calculated. Furthermore, the zero-degree flexural strength and the flexural modulus of the unidirectional material, as well as the modules of the fabric material, were measured as follows. A sample of fiber-reinforced composite material was cut out to a thickness, width, and length of 2 mm, 15 mm, and 100 mm, respectively. Four-point bending measurements were made using an Instron Universal Testing Machine (manufactured by Instron Corporation) under the conditions of a crosshead speed of 5.0 mm/min, support point span of 81 mm, indenter span of 27 mm, support point diameter of 4 mm, and indenter diameter of 10 mm. Then the flexural modulus was calculated from the flexural strength and data for 5 N to 50 N. Furthermore, the true Vf was determined from test specimens in accordance with the combustion method described in JIS 7075 (1991). Subsequently, the flexural strength was converted for a Vf of 60%.

(12) Method for Measuring Glass Transition Temperature of Fiber-Reinforced Composite Material For a fiber-reinforced composite material, measurements were made by the same procedure as described in item (6) above.

Reference Examples 1 to 9 and 17 to 24

Epoxy resins shown for Reference Examples 1 to 9 and 17 to 24 in Tables 1 and 2 were heated, melt-kneaded, and then cooled to 60° C., followed by adding a curing agent and curing catalyst to prepare epoxy resin compositions. Each of these resin compositions was defoamed in a vacuum and injected in a mold which was set up so that the thickness would be 2 mm by means of a 2 mm thick Teflon (registered trademark) spacer, followed by curing under the conditions described in each Reference example to prepare a 2 mm thick cured resin. The glass transition temperatures of such cured resins are shown in Table 1 and Table 2. In Reference Examples 1 to 9 and 18 to 24, the glass transition temperature was in a sufficiently high range of not less than 100° C., but it was less than 100° C. in Reference Example 17. Furthermore, DSC analysis showed no exothermic peak for all cured resins prepared in Reference Examples, indicating that the cured resins were in a completely cured state.

Reference Example 10

Epoxy resins shown for Reference Examples 10 in Table 1 was melt-kneaded and then cooled to 80° C., followed by adding a curing agent to prepare an epoxy resin composition. A cured resin was produced from this resin composition by the same procedure as in Reference Example 1 except that the curing was performed at 180° C. for 2 hours. The cured resin was acceptable in terms of both glass transition temperature and exothermic peak.

Reference Example 11

A curing catalyst was added to the curing agent shown for Reference Example 11 in Table 1, dissolved at 50° C., and cooled to room temperature, followed by adding an epoxy resin to prepare an epoxy resin composition. A cured resin was produced from this resin composition by carrying out the same procedure as described in Reference Example 1. The cured resin was acceptable in terms of both glass transition temperature and exothermic peak.

Examples 12, 13, 15, and 16

Epoxy resins as given for Reference Examples 12, 13, 15, and 16 in Tables 1 and 2 were melt-kneaded, and then, polyvinyl formal or a S-B-M copolymer was added, followed by dissolving them at 170° C. for 1 hour. Subsequently, the mixture was cooled to 60° C., and a curing agent and a curing catalyst were added to prepare an epoxy resin composition. A cured resin produced from this resin composition by carrying out the procedure described in Reference Example 1 was acceptable in terms of both glass transition temperature and exothermic peak.

Reference Example 14

An epoxy resin as given for Reference Example 14 in Table 2 was melt-kneaded, and then, polyether sulfone was added, followed by dissolving them at 170° C. for 1 hour. Subsequently, the mixture was cooled to 80° C., and a curing agent was added to prepare an epoxy resin composition. The cured resin was acceptable in terms of both glass transition temperature and exothermic peak.

Examples 25-39 and 47-54

Epoxy resins given for Reference Examples 25-39 and 47-54 in Table 3 or 4 were heated, melt-kneaded, and cooled to 60° C., and then component (A) or (E) was added and melt-kneaded, followed by adding a curing agent and curing catalyst at the same temperature to prepare epoxy resin compositions. A cured resin was produced from this epoxy resin composition by carrying out the same procedure as in Reference Example 1. In Reference Example 28, (A-4) was dissolved in the epoxy resin composition, and accordingly, the glass transition temperature of (A-4) disappeared. In Reference Example 30, the higher glass transition temperature (A-3) disappeared, and the higher glass transition temperature of the epoxy resin composition dropped to 98° C. In Reference Examples 25 to 27, 29, 31 to 39, and 47 to 54, dissolution of component (A) or (E) in the epoxy resin composition was not detected.

Reference Example 40

An epoxy resin given for Reference Examples 40 in Table 4 was melt-kneaded and cooled to 80° C., and then component (A) or (E) was added, followed by adding a curing agent to prepare an epoxy resin composition. A cured resin was produced from this epoxy resin composition by carrying out the same procedure as in Reference Example 10. A cured resin was produced from this resin composition by carrying out the same procedure as described in Reference Example 10. The cured resin was acceptable in terms of both glass transition temperature and exothermic peak.

Reference Example 41

A curing catalyst was added to the curing agent given for Reference Example 11 in Table 4, dissolved at 50° C., and cooled to room temperature. Elsewhere, component (A) or (E) was added to an epoxy resin, followed by melt-kneading them. These were kneaded at room temperature to prepare an epoxy resin composition. A cured resin was produced from this resin composition by carrying out the same procedure as described in Reference Example 1. The cured resin was acceptable in terms of both glass transition temperature and exothermic peak.

Examples 42, 43, 45, and 46

Epoxy resins as given for Reference Examples 42, 43, 45, and 46 in Table 4 were melt-kneaded, and then, polyvinyl formal or a S-B-M copolymer was added, followed by dissolving them at 170° C. for 1 hour. Subsequently, the mixture was cooled to 60° C., and component (A) or (E) was added, followed by adding a curing agent and a curing catalyst to prepare an epoxy resin composition. A cured resin was produced from this resin composition by carrying out the same procedure as described in Reference Example 1. The cured resin was acceptable in terms of both glass transition temperature and exothermic peak.

Reference Example 44

An epoxy resin as given for Reference Example 44 in Table 4 was melt-kneaded, and then, polyether sulfone was added, followed by dissolving them at 170° C. for 1 hour. Subsequently, the mixture was cooled to 80° C., and component (A) or (E) was added, followed by adding a curing agent to prepare an epoxy resin composition. A cured resin was produced from this epoxy resin composition by carrying out the same procedure as in Reference Example 10. The cured resin was acceptable in terms of both glass transition temperature and exothermic peak.

Comparative Example 1

Using a reverse roll coater, component (B) obtained in Reference Example 1 was applied to pieces of release paper to prepare resin films. Two of these resin films were attached to both surfaces of a sheet composed of fibers of (C-1) arranged in one direction, and pressure was applied using a heated press roll to impregnate the sheet with the resin composition of Reference Example 1, thereby preparing unidirectional prepreg precursors having a fiber weight per unit area of 125 g/m$^2$ and a fiber content by mass of 68%. Subsequently, 20 of these unidirectional prepreg precursor layers were stacked with all fibers oriented in one direction, and heated, pressed, and cured in an autoclave under a pressure of 0.3 MPa at the same temperature and for the same duration as described in Reference Example 1 prepare a fiber-reinforced composite material. The loss factor, 90-degree flexural strength, zero-degree flexural modulus, zero-degree flexural strength, and Tg were measured. Results are given in Table 8. Being low in loss factor, the material was not acceptable.

Example 1

Said (A-1), used as component (A), was uniformly sprayed on one surface of the unidirectional prepreg precursor obtained in Comparative Example 1, sandwiched between pieces of release paper, and passed between heated press rolls to prepare a unidirectional prepreg. The surface localization rate was a satisfactory 98%. Subsequently, 19 of these unidirectional prepreg layers were stacked so that all fibers are oriented in one direction and that the surface carrying component (A) is the upper surface, and additionally, a unidirectional prepreg precursor layer obtained in Comparative Example 1 was put in top it, followed by preparing a fiber-reinforced composite material by the same procedure as in Comparative Example 1. Results are given in Table 5. The interlayer localization rate was a satisfactory 96%. The loss factor, 90-degree flexural strength, zero-degree flexural modulus, and zero-degree flexural strength were 144%, 98%, 101%, and 100%, respectively, which were better as compared with Comparative Example 1. Tg was also satisfactory.

Comparative Example 2

A unidirectional prepreg precursor and a fiber-reinforced comparative material were produced by the same procedure as in Comparative Example 1 except that component (B) was replaced with that for Reference Example 2. Results are given in Table 8. Being low in loss factor, the material was not acceptable.

Example 2

A unidirectional prepreg was produced by the same procedure as in Example 1 except that said (A-2), used as component (A), was uniformly sprayed on one surface of the unidirectional prepreg obtained in Comparative Example 2. It was acceptable although the surface localization rate was slightly lower as compared with Example 1 because of smaller particle diameters of component (A). Next, a fiber-reinforced composite material was prepared by the same procedure as in Example 1. Results are given in Table 5. It was acceptable although the interlayer localization rate was slightly lower as compared with Example 1. The loss factor, 90-degree flexural strength, zero-degree flexural modulus, and zero-degree flexural strength were 138%, 92%, 98%, and 99% respectively, which were better as compared with Comparative Example 2 although slightly lower as compared with Example 1 because of a lower interlayer localization rate of component (A). Tg was also satisfactory.

Example 3

A unidirectional prepreg was produced by the same procedure as in Example 1 except that said (A-3) was used as component (A). The surface localization rate was a satisfactory 99%. Next, a fiber-reinforced composite material was prepared by the same procedure as in Example 1. Results are given in Table 5. The interlayer localization rate was a satisfactory 96%. The loss factor, 90-degree flexural strength, zero-degree flexural modulus, and zero-degree flexural strength were 131%, 90%, 97%, 94% respectively, which were better as compared with Comparative Example 1 although slightly lower as compared with Example 1 because of partial dissolution of component (A) in component (B), and Tg was also satisfactory although slightly lower as compared with Example 1.

Example 4

A unidirectional prepreg was produced by the same procedure as in Example 2 except that (A-1) was used as component (A) and added to a content of 7% by mass. Results are given in Table 5. The surface localization rate was a satisfactory 99%. Next, a fiber-reinforced composite material was prepared by the same procedure as in Example 1. Results are given in Table 5. The interlayer localization rate was a satisfactory 95%. The loss factor, 90-degree flexural strength, zero-degree flexural modulus, and zero-degree flexural strength were 162%, 93%, 99%, and 100%, respectively, as compared with Comparative Example 1. Tg was also satisfactory. The loss factor rose greatly as compared with Example 1.

Example 5

A unidirectional prepreg was produced by the same procedure as in Example 1 except that the content of component (A) was 15% by mass. Results are given in Table 5. The surface localization rate was a satisfactory 99%. Next, a fiber-reinforced composite material was prepared by the same procedure as in Example 1. Results are given in Table 5. The interlayer localization rate was a satisfactory 96%. The loss factor, 90-degree flexural strength, zero-degree flexural modulus, and zero-degree flexural strength were 188%, 91%, 96%, and 98%, respectively, which were better as compared with Comparative Example 1. Tg was also satisfactory. As compared with Example 1, the loss factor rose greatly, but the flexural strength and the zero-degree flexural modulus decreased.

Comparative Example 3

A unidirectional prepreg precursor and a fiber-reinforced comparative material were produced by the same procedure as in Comparative Example 1 except that component (B) was replaced with the resin composition of Reference Example 3. Results are given in Table 8. Being low in loss factor, the material was not acceptable.

Example 6

A unidirectional prepreg was produced by the same procedure as in Example 1 except that component (B) was replaced with the resin composition of Reference Example 3. The surface localization rate was a satisfactory 99%. Next, a fiber-reinforced composite material was prepared by the same procedure as in Example 1. The interlayer localization rate was a satisfactory 97%. The loss factor, 90-degree flexural strength, zero-degree flexural modulus, and zero-degree flexural strength were 140%, 98%, 96%, and 100%, respectively, which were better as compared with Comparative Example 3, and the flexural strength was slightly improved as compared with Example 1 by using 1.0 equivalent of the curing agent. Tg was also satisfactory.

Comparative Example 4

A unidirectional prepreg precursor and a fiber-reinforced comparative material were produced by the same procedure as in Comparative Example 1 except that component (B) was replaced with the resin composition of Reference Example 4. Results are given in Table 8. Being low in loss factor, the material was not acceptable.

Example 7

A unidirectional prepreg was produced by the same procedure as in Example 1 except that component (B) was replaced with the resin composition of Reference Example 4. The surface localization rate was a satisfactory 99%. Next, a fiber-reinforced composite material was prepared by the same procedure as in Example 1. Results are given in Table 5. The interlayer localization rate was a satisfactory 97%. The loss factor, 90-degree flexural strength, zero-degree flexural modulus, and zero-degree flexural strength were 137%, 98%, 100%, and 100%, respectively, which were better as compared with Comparative Example 4, and the flexural strength was slightly improved as compared with Example 1 by using 0.8 equivalent of the curing agent. Tg was also satisfactory.

Example 8

A unidirectional prepreg was produced by the same procedure as in Example 1 except that component (B) was replaced with the resin composition of Reference Example 2. The surface localization rate was a satisfactory 99%. Next, a fiber-reinforced composite material was prepared by the same procedure as in Example 1. Results are given in Table 5. The interlayer localization rate was a satisfactory 97%. The loss factor, 90-degree flexural strength, zero-degree flexural modulus, and zero-degree flexural strength were 140%, 98%, 97%, and 101%, respectively, which were better as compared with Comparative Example 2, and the flexural strength was slightly improved as compared with Example 1 by adding the curing catalyst to component (B) to 2% by mass. Tg was also satisfactory.

Comparative Example 5

A unidirectional prepreg precursor and a fiber-reinforced comparative material were produced by the same procedure as in Comparative Example 1 except that component (B) was replaced with the resin composition of Reference Example 5. Results are given in Table 8. Being low in loss factor, the material was not acceptable.

Example 9

A unidirectional prepreg was produced by the same procedure as in Example 1 except that component (B) was replaced with the resin composition of Reference Example 5. The surface localization rate was a satisfactory 98%. Next, a fiber-reinforced composite material was prepared by the same procedure as in Example 1. Results are given in Table 5. The interlayer localization rate was a satisfactory 97%. The loss factor, 90-degree flexural strength, zero-degree flexural modulus, and zero-degree flexural strength were 142%, 99%, 100%, and 100%, respectively, as compared with Comparative Example 5. Tg was also satisfactory. The flexural strength and Tg were increased as compared with Example 1 by using phenol novolac type epoxy resin as part of the epoxy resin in component (B).

Comparative Example 6

A unidirectional prepreg precursor and a fiber-reinforced comparative material were produced by the same procedure as in Comparative Example 1 except that component (B) was replaced with the resin composition of Reference Example 17. Results are given in Table 8. Being low in loss factor, the material had poor quality.

Example 10

A unidirectional prepreg was produced by the same procedure as in Example 1 except that component (B) was replaced with the resin composition of Reference Example 17. The surface localization rate was a satisfactory 98%. Next, a fiber-reinforced composite material was prepared by the same procedure as in Example 1. Results are given in Table 5. The interlayer localization rate was a satisfactory 95%. The loss factor, 90-degree flexural strength, zero-degree flexural modulus, and zero-degree flexural strength were 148%, 98%, 100%, and 99%, respectively, which were better as compared with Comparative Example 6. However, Tg decreased as compared with Example 1 as a result of using bisphenol type epoxy resin as the epoxy resin in the component (B).

Comparative Example 7

A unidirectional prepreg precursor and a fiber-reinforced comparative material were produced by the same procedure as in Comparative Example 1 except that component (B) was replaced with the resin composition of Reference Example 6. Results are given in Table 8. Being low in loss factor, the material was not acceptable.

Example 11

A unidirectional prepreg was produced by the same procedure as in Example 1 except that component (B) was replaced with the resin composition of Reference Example 6. The surface localization rate was a satisfactory 98%. Next, a fiber-reinforced composite material was prepared by the same procedure as in Example 1. Results are given in Table 5. The interlayer localization rate was a satisfactory 96%. The loss factor, 90-degree flexural strength, zero-degree flexural modulus, and zero-degree flexural strength were 136%, 99%, 104%, and 99%, respectively, which were better as compared with Comparative Example 7. Tg increased greatly as compared with Example 1 as a result of using dicyclopentadiene type epoxy resin as the epoxy resin in component (B).

Comparative Example 8

A unidirectional prepreg precursor and a fiber-reinforced comparative material were produced by the same procedure as in Comparative Example 1 except that component (B) was replaced with the resin composition of Reference Example 7. Results are given in Table 8. Being low in loss factor, the material was not acceptable.

Example 12

A unidirectional prepreg was produced by the same procedure as in Example 1 except that component (B) was replaced with the resin composition of Reference Example 7. The surface localization rate was a satisfactory 99%. Next, a fiber-reinforced composite material was prepared by the same procedure as in Example 1. Results are given in Table 6. The interlayer localization rate was a satisfactory 97%. The loss factor, 90-degree flexural strength, zero-degree flexural modulus, and zero-degree flexural strength were 138%, 98%, 99%, and 101%, respectively, which were better as compared with Comparative Example 8. The flexural strength and Tg increased greatly as compared with Example 1 as a result of using multifunctional amine type epoxy resin as the epoxy resin of component (B).

Comparative Example 9

A unidirectional prepreg precursor and a fiber-reinforced comparative material were produced by the same procedure as in Comparative Example 1 except that component (B) was replaced with the resin composition of Reference Example 8. Results are given in Table 8. Being low in loss factor, the material was not acceptable.

Example 13

A unidirectional prepreg was produced by the same procedure as in Example 1 except that component (B) was replaced with the resin composition of Reference Example 8. The surface localization rate was a satisfactory 99%. Next, a fiber-reinforced composite material was prepared by the same procedure as in Example 1. Results are given in Table 6. The interlayer localization rate was a satisfactory 95%. The loss factor, 90-degree flexural strength, zero-degree flexural modulus, and zero-degree flexural strength were 137%, 98%, 105%, and 99%, respectively, which were better as compared with Comparative Example 9. The flexural strength and Tg increased greatly as compared with Example 1 as a result of using epoxy resin having a biphenyl backbone as the epoxy resin of component (B).

Comparative Example 10

A unidirectional prepreg precursor and a fiber-reinforced comparative material were produced by the same procedure as in Comparative Example 1 except that component (B) was replaced with the resin composition of Reference Example 9. Results are given in Table 8. Being low in loss factor, the material was not acceptable.

Example 14

A unidirectional prepreg was produced by the same procedure as in Example 1 except that component (B) was replaced with the resin composition of Reference Example 9. The surface localization rate was a satisfactory 99%. Next, a fiber-reinforced composite material was prepared by the same procedure as in Example 1. Results are given in Table 6. The interlayer localization rate was a satisfactory 96%. The loss factor, 90-degree flexural strength, zero-degree flexural modulus, and zero-degree flexural strength were 141%, 97%, 99%, and 101%, respectively, which were better as compared with Comparative Example 10. Although the flexural strength slightly decreased, Tg increased as compared with Example 1 as a result of using isocyanate-modified epoxy resin as the epoxy resin of component (B).

Comparative Example 11

A unidirectional prepreg precursor and a fiber-reinforced comparative material were produced by the same procedure as in Comparative Example 1 except that component (B) was replaced with the resin composition of Reference Example 10. Results are given in Table 9. Being low in loss factor, the material was not acceptable.

Example 15

A unidirectional prepreg was produced by the same procedure as in Example 1 except that component (B) was replaced with the resin composition of Reference Example 10. The surface localization rate was a satisfactory 98%. Next, a fiber-reinforced composite material was prepared by the same procedure as in Example 1. Results are given in Table 6. The interlayer localization rate was a satisfactory 95%. The loss factor, 90-degree flexural strength, zero-degree flexural modulus, and zero-degree flexural strength were 140%, 98%, 98%, and 101%, respectively, which were better as compared with Comparative Example 11. Tg increased as compared with Example 13 as a result of using 4,4-diaminodiphenyl sulfone as the curing agent for component (B).

Comparative Example 12

A unidirectional prepreg precursor and a fiber-reinforced comparative material were produced by the same procedure as in Comparative Example 1 except that component (B) was replaced with the resin composition of Reference Example 12. Results are given in Table 9. Being low in loss factor, the material was not acceptable.

Example 16

A unidirectional prepreg was produced by the same procedure as in Example 1 except that component (B) was replaced with the resin composition of Reference Example 12. The surface localization rate was a satisfactory 99%. Next, a fiber-reinforced composite material was prepared by the same procedure as in Example 1. Results are given in Table 6. The interlayer localization rate was a satisfactory 95%. The loss factor, 90-degree flexural strength, zero-degree flexural modulus, and zero-degree flexural strength were 138%, 99%, 100%, and 100%, respectively, which were better as compared with Comparative Example 12. Tg was also satisfactory.

Comparative Example 13

A unidirectional prepreg precursor and a fiber-reinforced comparative material were produced by the same procedure as in Comparative Example 1 except that component (B) was replaced with the resin composition of Reference Example 13. Results are given in Table 9. Being low in loss factor, the material was not acceptable.

Example 17

A unidirectional prepreg was produced by the same procedure as in Example 1 except that component (B) was replaced with the resin composition of Reference Example 13. The surface localization rate was a satisfactory 99%. Next, a fiber-reinforced composite material was prepared by the same procedure as in Example 1. Results are given in Table 6. The interlayer localization rate was a satisfactory 96%. The loss factor, 90-degree flexural strength, zero-degree flexural modulus, and zero-degree flexural strength were 138%, 99%, 103%, and 99%, respectively, which were better as compared with Comparative Example 13. Tg was also satisfactory.

Comparative Example 14

A unidirectional prepreg precursor and a fiber-reinforced comparative material were produced by the same procedure as in Comparative Example 11 except that component (B) was replaced with the resin composition of Reference Example 14. Results are given in Table 9. Being low in loss factor, the material was not acceptable.

Example 18

A unidirectional prepreg was produced by the same procedure as in Example 1 except that component (B) was replaced with the resin composition of Reference Example 14. The surface localization rate was a satisfactory 99%. Next, a fiber-reinforced composite material was prepared by the same procedure as in Example 1. Results are given in Table 6. The interlayer localization rate was a satisfactory 96%. The loss factor, 90-degree flexural strength, zero-degree flexural modulus, and zero-degree flexural strength were 142%, 99%, 103%, and 98%, respectively, which were better as compared with Comparative Example 14. Tg was also satisfactory.

Comparative Example 15

A unidirectional prepreg precursor and a fiber-reinforced comparative material were produced by the same procedure as in Comparative Example 1 except that component (B) was replaced with the resin composition of Reference Example 15. Results are given in Table 9. Being low in loss factor, the material was not acceptable.

Example 19

A unidirectional prepreg was produced by the same procedure as in Example 1 except that component (B) was replaced with the resin composition of Reference Example 15. The surface localization rate was a satisfactory 98%. Next, a fiber-reinforced composite material was prepared by the same procedure as in Example 1. Results are given in Table 6. The interlayer localization rate was a satisfactory 97%. The loss factor, 90-degree flexural strength, zero-degree flexural modulus, and zero-degree flexural strength were 137%, 98%, 96%, and 100%, respectively, which were better as compared with Comparative Example 15. Tg was also satisfactory.

Comparative Example 16

A unidirectional prepreg precursor and a fiber-reinforced comparative material were produced by the same procedure as in Comparative Example 1 except that component (B) was replaced with the resin composition of Reference Example 16. Results are given in Table 9. Being low in loss factor, the material was not acceptable.

Example 20

The resin composition of Reference Example 16 and said (A-1) were kneaded by the same procedure as in Reference Example 46 to produce a resin composition. Using a reverse roll coater, this resin composition and the epoxy resin composition of Reference Example 1 were applied separately to pieces of release paper to prepare resin films. In the next place, using the resin film obtained in Reference Example 1, the same procedure as in Comparative Example 1 was carried out to produce a unidirectional prepreg precursor with a fiber mass per unit area of 125 g/m² and a fiber content by mass of 76%. The resin composition of Reference Example 16 and the resin film obtained from said (A-1) were stuck to a surface of this unidirectional prepreg precursor by applying a pressure using a heated press roll to produce a unidirectional prepreg. The surface localization rate was a satisfactory 99%. Using this unidirectional prepreg, the same procedure as described in Reference Example 1 was carried out to produce a fiber-reinforced composite material. Results are given in Table 6. The interlayer localization rate was a satisfactory 96%. The loss factor, 90-degree flexural strength, zero-degree flexural modulus, and zero-degree flexural strength were 138% and 98%, respectively, which were better as compared with Comparative Example 1, and 138%, 98%, 98%, and 100%, respectively, which were better as compared with Comparative Example 16. Tg was also satisfactory.

Example 21

The epoxy resin composition of Reference Example 16 and said (A-1) were kneaded by the same procedure as in Reference Example 46 to produce a resin composition. Using a reverse roll coater, this resin composition and the epoxy resin composition of Reference Example 16 were applied separately to pieces of release paper to prepare resin films. In the next place, using the resin film produced from the resin composition of Reference Example 16, the same procedure as in Comparative Example 1 was carried out to produce a unidirectional prepreg precursor with a fiber mass per unit area of 125 g/m² and a fiber content by mass of 76%. The resin composition of Reference Example 16 and the resin film obtained from said (A-1) were stuck to a surface of this unidirectional prepreg precursor by applying a pressure using a heated press roll to produce a unidirectional prepreg. The surface localization rate was a satisfactory 98%. Using this unidirectional prepreg, the same procedure as described in Reference Example 1 was carried out to produce a fiber-reinforced composite material. Results are given in Table 6. The interlayer localization rate was a satisfactory 95%. The loss factor, 90-degree flexural strength, zero-degree flexural modulus, and zero-degree flexural strength were 139%, 98%, 102%, and 99%, respectively, which were better as compared with Comparative Example 16. Tg was also satisfactory.

Example 22

Said (A-1), used as component (A), was uniformly sprayed on both surfaces of the unidirectional prepreg precursor obtained in Comparative Example 1, sandwiched between pieces of release paper, and passed between heated press rolls to prepare unidirectional prepregs. The surface localization rate was a satisfactory 98%. A fiber-reinforced composite material was prepared by the same procedure as in Comparative Example 1 except that 18 of these unidirectional prepreg layers were stacked, followed by adding one unidirectional prepreg precursor layer as produced in Comparative Example 1 to both surfaces of the stack. Results are given in Table 6. The interlayer localization rate was a satisfactory 96%. The loss factor, 90-degree flexural strength, zero-degree flexural modulus, and zero-degree flexural strength were 135%, 99%, 100%, and 101%, respectively, which were better as compared with Comparative Example 1. Tg was also satisfactory.

Comparative Example 17

A unidirectional prepreg precursor and a fiber-reinforced comparative material were produced by the same procedure as in Comparative Example 1 except that component (B) was replaced with the resin composition of Reference Example 18. Results are given in Table 9. Being low in loss factor, the material was not acceptable.

Example 23

A unidirectional prepreg was produced by the same procedure as in Example 1 except that component (B) was replaced with the resin composition of Reference Example 18. The surface localization rate was a satisfactory 99%. Next, a fiber-reinforced composite material was prepared by the same procedure as in Example 1. Results are given in Table 7. The interlayer localization rate was a satisfactory 96%. The loss factor, 90-degree flexural strength, zero-degree flexural modulus, and zero-degree flexural strength were 144%, 98%, 103%, and 100%, respectively, which were better as compared with Comparative Example 17. Tg was also satisfactory. The loss factor increased as compared with Example 1 as a result of adding bisphenol A type epoxy resin with an epoxy equivalent of 810 to the epoxy resin of component (B).

Comparative Example 18

A unidirectional prepreg precursor and a fiber-reinforced comparative material were produced by the same procedure as in Comparative Example 1 except that component (B) was replaced with the resin composition of Reference Example 19. Results are given in Table 9. Being low in loss factor, the material was not acceptable.

Example 24

A unidirectional prepreg was produced by the same procedure as in Example 1 except that component (B) was replaced with the resin composition of Reference Example 19. The surface localization rate was a satisfactory 98%. Next, a fiber-reinforced composite material was prepared by the same procedure as in Example 1. Results are given in Table 7. The interlayer localization rate was a satisfactory 97%. The loss factor, 90-degree flexural strength, zero-degree flexural modulus, and zero-degree flexural strength were 144%, 98%, 93%, and 101%, respectively, which were better as compared with Comparative Example 18. Tg was also satisfactory. The loss factor increased as compared with Example 1 as a result of adding bisphenol A type epoxy resin with an epoxy equivalent of 1930 to the epoxy resin of component (B).

Comparative Example 19

A unidirectional prepreg precursor and a fiber-reinforced comparative material were produced by the same procedure as in Comparative Example 1 except that component (B) was replaced with the resin composition of Reference Example 20. Results are given in Table 9. Being low in loss factor, the material was not acceptable.

Example 25

A unidirectional prepreg was produced by the same procedure as in Example 1 except that component (B) was replaced with the resin composition of Reference Example 20. The surface localization rate was a satisfactory 98%. Next, a fiber-reinforced composite material was prepared by the same procedure as in Example 1. Results are given in Table 7. The interlayer localization rate was a satisfactory 95%. The loss factor, 90-degree flexural strength, zero-degree flexural modulus, and zero-degree flexural strength were 146%, 99%, 100%, and 100%, respectively, which were better as compared with Comparative Example 19. Tg was also satisfactory. The loss factor increased as compared with Example 1 as a result of adding bisphenol A type epoxy resin with an epoxy equivalent of 4000 to the epoxy resin of component (B).

Comparative Example 20

A unidirectional prepreg precursor and a fiber-reinforced comparative material were produced by the same procedure as in Comparative Example 1 except that component (B) was replaced with the resin composition of Reference Example 21. Results are given in Table 9. Being low in loss factor, the material was not acceptable.

Example 26

A unidirectional prepreg was produced by the same procedure as in Example 1 except that component (B) was replaced with the resin composition of Reference Example 21. The surface localization rate was a satisfactory 97%. Next, a fiber-reinforced composite material was prepared by the same procedure as in Example 1. Results are given in Table 7. The interlayer localization rate was a satisfactory 98%. The loss factor, 90-degree flexural strength, zero-degree flexural modulus, and zero-degree flexural strength were 145%, 98%, 103%, and 100%, respectively, which were better as compared with Comparative Example 20. Tg was also satisfactory. the strength increased as compared with Example 1 as a result of adding bisphenol F type epoxy resin to the epoxy resin of the component (B).

Comparative Example 21

A unidirectional prepreg precursor and a fiber-reinforced comparative material were produced by the same procedure as in Comparative Example 1 except that component (B) was replaced with the resin composition of Reference Example 22. Results are given in Table 9. Being low in loss factor, the material was not acceptable.

Example 27

A unidirectional prepreg was produced by the same procedure as in Example 1 except that component (B) was replaced with the resin composition of Reference Example 22. The surface localization rate was a satisfactory 99%. Next, a fiber-reinforced composite material was prepared by the same procedure as in Example 1. Results are given in Table 7. The interlayer localization rate was a satisfactory 97%. The loss factor, 90-degree flexural strength, zero-degree flexural modulus, and zero-degree flexural strength were 143%, 98%, 96%, and 99%, respectively, which were better as compared with Comparative Example 21. Tg was also satisfactory. The loss factor increased as compared with Example 26 as a result of adding bisphenol F type epoxy resin with an epoxy equivalent of 800 to the epoxy resin of component (B).

Comparative Example 22

A unidirectional prepreg precursor and a fiber-reinforced comparative material were produced by the same procedure as in Comparative Example 1 except that component (B) was replaced with the resin composition of Reference Example 23. Results are given in Table 10. Being low in loss factor, the material was not acceptable.

Example 28

A unidirectional prepreg was produced by the same procedure as in Example 1 except that component (B) was replaced with the resin composition of Reference Example 23. The surface localization rate was a satisfactory 99%. Next, a fiber-reinforced composite material was prepared by the same procedure as in Example 1. Results are given in Table 7. The interlayer localization rate was a satisfactory 97%. The loss factor, 90-degree flexural strength, zero-degree flexural modulus, and zero-degree flexural strength were 146%, 98%, 96%, and 100%, respectively, which were better as compared with Comparative Example 22. Tg was also satisfactory. The loss factor increased as compared with Example 26 as a result of adding bisphenol F type epoxy resin with an epoxy equivalent of 2,270 to the epoxy resin of component (B).

Comparative Example 23

A unidirectional prepreg precursor and a fiber-reinforced comparative material were produced by the same procedure as in Comparative Example 1 except that component (B) was replaced with the resin composition of Reference Example 24. Results are given in Table 10. Being low in loss factor, the material was not acceptable.

Example 29

A unidirectional prepreg was produced by the same procedure as in Example 1 except that component (B) was replaced with the resin composition of Reference Example 24. The surface localization rate was a satisfactory 98%. Next, a fiber-reinforced composite material was prepared by the same procedure as in Example 1. Results are given in Table 7. The interlayer localization rate was a satisfactory 97%. The loss factor, 90-degree flexural strength, zero-degree flexural modulus, and zero-degree flexural strength were 145%, 100%, 97%, and 100%, respectively, which were better as compared with Comparative Example 23. Tg was also satisfactory. The loss factor increased as compared with Example 26 as a result of adding bisphenol F type epoxy resin with an epoxy equivalent of 4,400 to the epoxy resin of component (B).

Comparative Example 24

Said (A-8), used as component (A), was stuck to one surface of the unidirectional prepreg precursor obtained in Comparative Example 1, sandwiched between pieces of release paper, and passed between heated press rolls to prepare a unidirectional prepreg. Results are given in Table 10. The surface localization rate was a satisfactory 100%. Using this unidirectional prepreg, the same procedure as described in Reference Example 1 was carried out to produce a fiber-reinforced composite material. The interlayer localization rate was a satisfactory 100%. Furthermore, the loss factor was also a satisfactory 570% as compared with Comparative Example 1, whereas the flexural strength was a low 82% and the higher-side Tg decreased as result of partial dissolution of component (A) in component (B).

Comparative Example 25

A unidirectional prepreg precursor and a fiber-reinforced comparative material were produced by the same procedure as in Comparative Example 1 except that component (A) was replaced with said (A-4). (A-4) dissolved in Comparative Example 1, and accordingly, it was impossible to measure the surface localization rate. Using this unidirectional prepreg, the same procedure as described in Reference Example 1 was carried out to produce a fiber-reinforced composite material. Results are given in Table 10. It was impossible to measure the interlayer localization rate. The loss factor and the flexural strength were unpreferable 112% and 85%, respectively, as compared with Comparative Example 1. Tg was also unsatisfactory.

Comparative Example 26

A unidirectional prepreg precursor and a fiber-reinforced comparative material were produced by the same procedure as in Example 1 except that component (A) was replaced with said (A-5). Results are given in Table 10. The surface localization rate was a satisfactory 97%. Using this unidirectional prepreg, the same procedure as described in Reference Example 1 was carried out to produce a fiber-reinforced composite material. The interlayer localization rate was a satisfactory 95%. The flexural strength was a satisfactory 99% as compared with Comparative Example 1, but the loss factor was a low 115%. Tg was also satisfactory.

Comparative Example 27

A unidirectional prepreg precursor and a fiber-reinforced comparative material were produced by the same procedure as in Example 1 except that component (A) was replaced with said (A-6). Results are given in Table 10. The surface localization rate was an unsatisfactory 88%. Using this unidirectional prepreg, the same procedure as described in Reference Example 1 was carried out to produce a fiber-reinforced composite material. The surface localization rate was an unsatisfactory 83%. The loss factor and the flexural strength were also unsatisfactory as compared with Example 1.

Comparative Example 28

A unidirectional prepreg precursor and a fiber-reinforced comparative material were produced by the same procedure as in Example 1 except that component (A) was replaced with said (A-7). Results are given in Table 10. The surface localization rate was a satisfactory 100%. Using this unidirectional prepreg, the same procedure as described in Reference Example 1 was carried out to produce a fiber-reinforced composite material. The interlayer localization factor was 99%, and the loss factor was a satisfactory 142% as compared with Comparative Example 1. However, the flexural strength was an unpreferable 88% as compared with Comparative Example 1.

Comparative Example 29

A unidirectional prepreg precursor and a fiber-reinforced comparative material were produced by the same procedure as in Comparative Example 1 except that component (C) was replaced with said (C-3). Results are given in Table 10. Being low in loss factor, the material was not acceptable.

Example 30

A unidirectional prepreg was produced by the same procedure as in Example 1 except that component (C) was replaced with said (C-3). The surface localization rate was a satisfactory 98%. Next, a fiber-reinforced composite material was prepared by the same procedure as in Example 1. Results are given in Table 7. The interlayer localization rate was a satisfactory 98%. The loss factor, 90-degree flexural strength, zero-degree flexural modulus, and zero-degree flexural strength were 121%, 98%, 99%, and 100%, respectively, which were better as compared with Comparative Example 29. Tg was also satisfactory. The balance among loss factor, modulus, and strength was satisfactory, similarly to the case of Example 1, as a result of using (C-3) for (C), Comparative Example 30

A unidirectional prepreg precursor and a fiber-reinforced comparative material were produced by the same procedure as in Comparative Example 1 except that component (C) was replaced with said (C-4). Results are given in Table 10. Being low in loss factor, the material was not acceptable.

Example 31

A unidirectional prepreg was produced by the same procedure as in Example 1 except that component (C) was replaced with said (C-4). The surface localization rate was a satisfactory 97%. Next, a fiber-reinforced composite material was prepared by the same procedure as in Example 1. Results are given in Table 7. The interlayer localization rate was a satisfactory 98%. The loss factor, 90-degree flexural strength, zero-degree flexural modulus, and zero-degree flexural strength were 116%, 98%, 101%, and 101%, respectively, which were better as compared with Comparative Example 30. Tg was also satisfactory.

Comparative Example 31

A unidirectional prepreg precursor and a fiber-reinforced comparative material were produced by the same procedure as in Comparative Example 1 except that component (C) was replaced with said (C-5). Results are given in Table 10. Being low in loss factor, the material was not acceptable.

Example 32

A unidirectional prepreg was produced by the same procedure as in Example 1 except that component (C) was replaced with said (C-5). The surface localization rate was a satisfactory 98%. Next, a fiber-reinforced composite material was prepared by the same procedure as in Example 1. Results are given in Table 7. The interlayer localization rate was a satisfactory 96%. The loss factor, 90-degree flexural strength, zero-degree flexural modulus, and zero-degree flexural strength were 119%, 97%, 100%, and 101%, respectively, which were better as compared with Comparative Example 31. Tg was also satisfactory.

Comparative Example 32

A unidirectional prepreg precursor and a fiber-reinforced comparative material were produced by the same procedure as in Comparative Example 1 except that component (C) was replaced with said (C-6). Results are given in Table 10. Being low in loss factor, the material was not acceptable.

Example 33

A unidirectional prepreg was produced by the same procedure as in Example 1 except that component (C) was replaced with said (C-6). The surface localization rate was a satisfactory 97%. Next, a fiber-reinforced composite material was prepared by the same procedure as in Example 1. Results are given in Table 7. The interlayer localization rate was a satisfactory 97%. The loss factor, 90-degree flexural strength, zero-degree flexural modulus, and zero-degree flexural strength were 118%, 95%, 100%, and 101%, respectively, which were better as compared with Comparative Example 32. Tg was also satisfactory.

Comparative Example 33

Six layers of said (C-2) were stacked in the cavity of a mold having a plate-like cavity measuring 300 mm long, 300 mm wide, and 2 mm thick, and mold-clamped by a pressing device. In the next place, the interior of the mold, which was held at 100° C. (molding temperature), was depressurized by vacuum pumping to a level 0.1 MPa lower than atmospheric pressure, and epoxy resin of Reference Example 11 heated at 50° C. and mixed with a mixture of a curing agent and a curing catalyst in a resin injection machine was injected into the mold at a pressure of 0.2 MPa. The mold was opened 30 minutes (curing time) after the start of injection of the epoxy resin composition and the fiber-reinforced composite material precursor produced was removed from the mold. The resulting fiber-reinforced composite material precursor was post-cured for 1 hour in an oven preheated at 130° C. Results are given in Table 11. The loss factor of the fiber-reinforced composite material was unsatisfactory.

Example 34

Six layers of said (C-2) were stacked, with said (A-1) sprayed uniformly between the layers, in the cavity of a mold having a plate-like cavity measuring 300 mm long, 300 mm wide, and 2 mm thick, and mold-clamped by a pressing device. In the next place, the interior of the mold, which was held at 100° C. (molding temperature), was depressurized by vacuum pumping to a level 0.1 MPa lower than atmospheric pressure, and epoxy resin of Reference Example 11 heated at 50° C. and mixed with a mixture of a curing agent and a curing catalyst in a resin injection machine was injected into the mold at a pressure of 0.2 MPa. The mold was opened 30 minutes (curing time) after the start of injection of the epoxy resin composition and the fiber-reinforced composite material precursor produced was removed from the mold. The resulting fiber-reinforced composite material precursor was post-cured for 1 hour in an oven preheated at 130° C. Results are given in Table 11. The interlayer localization rate of the fiber-reinforced composite material was a satisfactory 95%. The loss factor and the flexural strength were satisfactory 139% and 98%, respectively, as compared with Comparative Example 21. Tg was also satisfactory.

TABLE 1

|  |  |  | Unit | Reference Example ||||||
|---|---|---|---|---|---|---|---|---|---|
|  |  |  |  | 1 | 2 | 3 | 4 | 5 | 6 |
| Epoxy resin composition | Epoxy resin | B-1 | Part by mass | 50 | 50 | 50 | 50 | 20 | — |
|  |  | B-2 |  | 50 | 50 | 50 | 50 | 30 | 50 |
|  |  | B-3 |  | — | — | — | — | — | — |
|  |  | B-4 |  | — | — | — | — | — | — |
|  |  | B-5 |  | — | — | — | — | 50 | — |
|  |  | B-6 |  | — | — | — | — | — | 50 |
|  |  | B-7 |  | — | — | — | — | — | — |
|  |  | B-8 |  | — | — | — | — | — | — |
|  |  | B-9 |  | — | — | — | — | — | — |
|  | Curing agent | B-16 | Equivalent | 1.2 | 1.0 | 1.0 | 0.8 | 1.2 | 1.2 |
|  |  | B-17 |  | — | — | — | — | — | — |
|  |  | B-18 |  | — | — | — | — | — | — |
|  | Curing catalyst | B-19 | Part by mass | 4 | 3 | 4 | 4 | 4 | 4 |
|  |  | B-20 |  | — | — | — | — | — | — |
|  | Others | Polyvinyl formal | Part by mass | — | — | — | — | — | — |
|  |  | S-B-M copolymer |  | — | — | — | — | — | — |
|  |  | Polyester sulfone |  | — | — | — | — | — | — |
| Curing conditions for epoxy resin composition |  |  | — | 130° C. 90 min. | 130° C. 90 min. | 130° C. 90 min. | 130° C. 90 min. | 130° C. 90 min. | 130° C. 90 min. |
| Tg of cured epoxy resin composition |  |  | ° C. | 118 | 115 | 116 | 112 | 134 | 138 |
| Exothermic peak of cured epoxy resin composition |  |  | — | None | None | None | None | None | None |

|  |  |  | Reference Example |||||||
|---|---|---|---|---|---|---|---|---|
|  |  |  | 7 | 8 | 9 | 10 | 11 | 12 |
| Epoxy resin composition | Epoxy resin | B-1 | 50 | — | — | 50 | — | 40 |
|  |  | B-2 | — | 50 | 50 | — | 100 | 60 |
|  |  | B-3 | — | — | — | — | — | — |
|  |  | B-4 | — | — | — | — | — | — |
|  |  | B-5 | — | — | — | — | — | — |
|  |  | B-6 | — | — | — | — | — | — |
|  |  | B-7 | 50 | — | — | 50 | — | — |
|  |  | B-8 | — | 50 | — | — | — | — |
|  |  | B-9 | — | — | 50 | — | — | — |
|  | Curing agent | B-16 | 1.2 | 1.2 | 1.2 | — | — | 1.0 |
|  |  | B-17 | — | — | — | 1.2 | — | — |
|  |  | B-18 | — | — | — | — | 1.2 | — |

TABLE 1-continued

| | | | | | | | | |
|---|---|---|---|---|---|---|---|---|
| | Curing catalyst | B-19 | 4 | 4 | 4 | — | — | 4 |
| | | B-20 | — | — | — | — | 3 | — |
| | Others | Polyvinyl formal | — | — | — | — | — | 3 |
| | | S-B-M copolymer | — | — | — | — | — | — |
| | | Polyester sulfone | — | — | — | — | — | — |
| Curing conditions for epoxy resin composition | | | 130° C. 90 min. | 130° C. 90 min. | 130° C. 90 min. | 180° C. 120 min. | 130° C. 90 min. | 130° C. 90 min. |
| Tg of cured epoxy resin composition | | | 170 | 143 | 133 | 196 | 145 | 115 |
| Exothermic peak of cured epoxy resin composition | | | None | None | None | None | None | None |

TABLE 2

| | | | | Reference Example | | | | | |
|---|---|---|---|---|---|---|---|---|---|
| | | | Unit | 13 | 14 | 15 | 16 | 17 | 18 |
| Epoxy resin composition | Epoxy resin | B-1 | Part by mass | 40 | 50 | 30 | 30 | — | — |
| | | B-2 | | 30 | — | 70 | 70 | — | 55 |
| | | B-3 | | — | — | — | — | 65 | — |
| | | B-4 | | 30 | — | — | — | 35 | — |
| | | B-5 | | — | — | — | — | — | — |
| | | B-6 | | — | — | — | — | — | — |
| | | B-7 | | — | 50 | — | — | — | — |
| | | B-8 | | — | — | — | — | — | — |
| | | B-9 | | — | — | — | — | — | — |
| | | B-10 | | — | — | — | — | — | 45 |
| | | B-11 | | — | — | — | — | — | — |
| | | B-12 | | — | — | — | — | — | — |
| | | B-13 | | — | — | — | — | — | — |
| | | B-14 | | — | — | — | — | — | — |
| | | B-15 | | — | — | — | — | — | — |
| | Curing agent | B-16 | Equivalent | 1.0 | — | 1.2 | 1.2 | 1.2 | 1.2 |
| | | B-17 | | — | 1.2 | — | — | — | — |
| | | B-18 | | — | — | — | — | — | — |
| | Curing catalyst | B-19 | Part by mass | 4 | — | 4 | 4 | 4 | 4 |
| | | B-20 | | — | — | — | — | — | — |
| | Others | Polyvinyl formal | Part by mass | — | — | 2 | 5 | — | — |
| | | S-B-M copolymer | | 3 | — | — | — | — | — |
| | | Polyester sulfone | | — | 3 | — | — | — | — |
| Curing conditions for epoxy resin composition | | | — | 130° C. 90 min. | 180° C. 120 min. | 130° C. 90 min. | 130° C. 90 min. | 130° C. 90 min. | 130° C. 90 min. |
| Tg of cured epoxy resin composition | | | ° C. | 105 | 197 | 118 | 116 | 93 | 116 |
| Exothermic peak of cured epoxy resin composition | | | — | None | None | None | None | None | None |

| | | | Reference Example | | | | | |
|---|---|---|---|---|---|---|---|---|
| | | | 19 | 20 | 21 | 22 | 23 | 24 |
| Epoxy resin composition | Epoxy resin | B-1 | — | — | 50 | 45 | 40 | 35 |
| | | B-2 | 60 | 65 | 20 | 25 | 30 | 35 |
| | | B-3 | — | — | 30 | — | — | — |
| | | B-4 | — | — | — | — | — | — |
| | | B-5 | — | — | — | — | — | — |
| | | B-6 | — | — | — | — | — | — |
| | | B-7 | — | — | — | — | — | — |
| | | B-8 | — | — | — | — | — | — |
| | | B-9 | — | — | — | — | — | — |
| | | B-10 | — | — | — | — | — | — |
| | | B-11 | 40 | — | — | — | — | — |
| | | B-12 | — | 35 | — | — | — | — |
| | | B-13 | — | — | — | 30 | — | — |
| | | B-14 | — | — | — | — | 30 | — |
| | | B-15 | — | — | — | — | — | 30 |
| | Curing agent | B-16 | 1.2 | 1.2 | 1.2 | 1.2 | 1.2 | 1.2 |
| | | B-17 | — | — | — | — | — | — |
| | | B-18 | — | — | — | — | — | — |
| | Curing catalyst | B-19 | 4 | 4 | 4 | 4 | 4 | 4 |
| | | B-20 | — | — | — | — | — | — |
| | Others | Polyvinyl | — | — | — | — | — | — |

TABLE 2-continued

|  |  |  |  |  |  |  |  |
|---|---|---|---|---|---|---|---|
|  | formal |  |  |  |  |  |  |
|  | S-B-M copolymer | — | — | — | — | — | — |
|  | Polyester sulfone | — | — | — | — | — | — |
| Curing conditions for epoxy resin composition |  | 130° C. 90 min. | 130° C. 90 min. | 130° C. 90 min. | 130° C. 90 min. | 130° C. 90 min. | 130° C. 90 min. |
| Tg of cured epoxy resin composition |  | 115 | 115 | 104 | 103 | 103 | 102 |
| Exothermic peak of cured epoxy resin composition |  | None | None | None | None | None | None |

TABLE 3

|  |  |  |  | Reference Example | | | | | | | |
|---|---|---|---|---|---|---|---|---|---|---|---|
|  |  |  |  | 25 | 26 | 27 | 28 | 29 | 30 | 31 | 32 |
| Resin composition | Components (A) and (E) | A-1 | % by mass | 15 | — | — | — | — | — | — | 15 |
|  |  | A-2 |  | — | 15 | — | — | — | — | — | — |
|  |  | A-3 |  | — | — | — | — | — | 15 | — | — |
|  |  | A-4 |  | — | — | — | 15 | — | — | — | — |
|  |  | A-5 |  | — | — | 15 | — | — | — | — | — |
|  |  | A-6 |  | — | — | — | — | 15 | — | — | — |
|  |  | A-7 |  | — | — | — | — | — | — | 15 | — |
|  | Epoxy resin composition | Reference Example 1 |  | 85 | — | 85 | 85 | 85 | 85 | 85 | — |
|  |  | Reference Example 2 |  | — | 85 | — | — | — | — | — | — |
|  |  | Reference Example 3 |  | — | — | — | — | — | — | — | 85 |
|  |  | Reference Example 4 |  | — | — | — | — | — | — | — | — |
|  |  | Reference Example 5 |  | — | — | — | — | — | — | — | — |
|  |  | Reference Example 6 |  | — | — | — | — | — | — | — | — |
|  |  | Reference Example 7 |  | — | — | — | — | — | — | — | — |
|  |  | Reference Example 8 |  | — | — | — | — | — | — | — | — |
|  |  | Reference Example 9 |  | — | — | — | — | — | — | — | — |
| Tg of epoxy resin |  |  | ° C. | −26,117 | −27,116 | −4,116 | 95 | −3,117 | −56,98 | −3,116 | −27,116 |

|  |  |  |  | Reference Example | | | | | | |
|---|---|---|---|---|---|---|---|---|---|---|
|  |  |  |  | 33 | 34 | 35 | 36 | 37 | 38 | 39 |
| Resin composition | Components (A) and (E) | A-1 | % by mass | 15 | 15 | 15 | 15 | 15 | 15 | 15 |
|  |  | A-2 |  | — | — | — | — | — | — | — |
|  |  | A-3 |  | — | — | — | — | — | — | — |
|  |  | A-4 |  | — | — | — | — | — | — | — |
|  |  | A-5 |  | — | — | — | — | — | — | — |
|  |  | A-6 |  | — | — | — | — | — | — | — |
|  |  | A-7 |  | — | — | — | — | — | — | — |
|  | Epoxy resin composition | Reference Example 1 |  | — | — | — | — | — | — | — |
|  |  | Reference Example 2 |  | — | 85 | — | — | — | — | — |
|  |  | Reference Example 3 |  | — | — | — | — | — | — | — |
|  |  | Reference Example 4 |  | 85 | — | — | — | — | — | — |
|  |  | Reference Example 5 |  | — | — | 85 | — | — | — | — |
|  |  | Reference Example 6 |  | — | — | — | 85 | — | — | — |
|  |  | Reference Example 7 |  | — | — | — | — | 85 | — | — |
|  |  | Reference Example 8 |  | — | — | — | — | — | 85 | — |
|  |  | Reference Example 9 |  | — | — | — | — | — | — | 85 |
| Tg of epoxy resin |  |  | ° C. | −27,112 | −27,115 | −26,133 | −27,136 | −27,170 | −26,140 | −26,132 |

TABLE 4

|  |  |  |  | Reference Example | | | | | | | |
|---|---|---|---|---|---|---|---|---|---|---|---|
|  |  |  |  | 40 | 41 | 42 | 43 | 44 | 45 | 46 | 47 |
| Resin composition | Components (A) and (E) | A-1 | % by mass | 15 | 15 | 15 | 15 | 15 | 15 | 15 | 15 |
|  |  | A-2 |  | — | — | — | — | — | — | — | — |
|  |  | A-3 |  | — | — | — | — | — | — | — | — |
|  |  | A-4 |  | — | — | — | — | — | — | — | — |
|  |  | A-5 |  | — | — | — | — | — | — | — | — |
|  |  | A-6 |  | — | — | — | — | — | — | — | — |
|  |  | A-7 |  | — | — | — | — | — | — | — | — |
|  | Epoxy resin composition | Reference Example 10 |  | 85 | — | — | — | — | — | — | — |
|  |  | Reference Example 11 |  | — | 85 | — | — | — | — | — | — |
|  |  | Reference Example 12 |  | — | — | 85 | — | — | — | — | — |
|  |  | Reference Example 13 |  | — | — | — | 85 | — | — | — | — |
|  |  | Reference Example 14 |  | — | — | — | — | 85 | — | — | — |

TABLE 4-continued

|  |  |  |  |  |  |  |  |  |  |
|---|---|---|---|---|---|---|---|---|---|
|  | Reference Example 15 |  | — | — | — | — | — | 85 | — | — |
|  | Reference Example 16 |  | — | — | — | — | — | — | 85 | — |
|  | Reference Example 17 |  | — | — | — | — | — | — | — | 85 |
|  | Reference Example 18 |  | — | — | — | — | — | — | — | — |
|  | Reference Example 19 |  | — | — | — | — | — | — | — | — |
|  | Reference Example 20 |  | — | — | — | — | — | — | — | — |
|  | Reference Example 21 |  | — | — | — | — | — | — | — | — |
|  | Reference Example 22 |  | — | — | — | — | — | — | — | — |
|  | Reference Example 23 |  | — | — | — | — | — | — | — | — |
|  | Reference Example 24 |  | — | — | — | — | — | — | — | — |
| Tg of epoxy resin |  | ° C. | −26,195 | −25,146 | −27,115 | −27,105 | −28,195 | −26,118 | −26,115 | −25,94 |

|  |  |  |  | Reference Example | | | | | | |
|---|---|---|---|---|---|---|---|---|---|---|
|  |  |  |  | 48 | 49 | 50 | 51 | 52 | 53 | 54 |
| Resin composition | Components (A) and (E) | A-1 | % by mass | 15 | 15 | 15 | 15 | 15 | 15 | 15 |
|  |  | A-2 |  | — | — | — | — | — | — | — |
|  |  | A-3 |  | — | — | — | — | — | — | — |
|  |  | A-4 |  | — | — | — | — | — | — | — |
|  |  | A-5 |  | — | — | — | — | — | — | — |
|  |  | A-6 |  | — | — | — | — | — | — | — |
|  |  | A-7 |  | — | — | — | — | — | — | — |
|  | Epoxy resin composition | Reference Example 10 |  | — | — | — | — | — | — | — |
|  |  | Reference Example 11 |  | — | — | — | — | — | — | — |
|  |  | Reference Example 12 |  | — | — | — | — | — | — | — |
|  |  | Reference Example 13 |  | — | — | — | — | — | — | — |
|  |  | Reference Example 14 |  | — | — | — | — | — | — | — |
|  |  | Reference Example 15 |  | — | — | — | — | — | — | — |
|  |  | Reference Example 16 |  | — | — | — | — | — | — | — |
|  |  | Reference Example 17 |  | — | — | — | — | — | — | — |
|  |  | Reference Example 18 |  | 85 | — | — | — | — | — | — |
|  |  | Reference Example 19 |  | — | 85 | — | — | — | — | — |
|  |  | Reference Example 20 |  | — | — | 85 | — | — | — | — |
|  |  | Reference Example 21 |  | — | — | — | 85 | — | — | — |
|  |  | Reference Example 22 |  | — | — | — | — | 85 | — | — |
|  |  | Reference Example 23 |  | — | — | — | — | — | 85 | — |
|  |  | Reference Example 24 |  | — | — | — | — | — | — | 85 |
| Tg of epoxy resin |  |  | ° C. | −25,116 | −25,114 | −26,114 | −26,105 | −26,103 | −25,104 | −27,101 |

TABLE 5

|  |  |  |  | Example | | | | | |
|---|---|---|---|---|---|---|---|---|---|
|  |  |  |  | 1 | 2 | 3 | 4 | 5 | 6 |
| Prepreg | Component (A) | Material name | | A-1 3 | A-2 3 | A-3 3 | A-1 7 | A-1 15 | A-1 3 |
|  | Component (B) | % by mass | | Reference Example 1 33 | Reference Example 2 33 | Reference Example 1 33 | Reference Example 2 30 | Reference Example 1 27 | Reference Example 3 33 |
|  | Component (C) |  | | C-1 64 | C-1 64 | C-1 64 | C-1 63 | C-1 58 | C-1 64 |
|  | Component (D) |  | | — | — | — | — | — | — |
|  | Surface where (A) is present | — | | One surface | One surface | One surface | One surface | One surface | One surface |
|  | Surface localization rate | % | | 98 | 94 | 99 | 99 | 99 | 99 |
| Fiber-reinforced composite material | Stacked structure [1] |  | | (I) | (I) | (I) | (I) | (I) | (I) |
|  | Interlayer localization rate | % | | 96 | 91 | 96 | 95 | 96 | 97 |
|  | Loss factor |  | | 0.0075 | 0.0072 | 0.0068 | 0.0085 | 0.0098 | 0.0074 |
|  | 90-degree flexural strength [2] | MPa | | 120 | 117 | 111 | 119 | 115 | 122 |
|  | Zero-degree flexural modulus [2] | GPa | | 122 | 117 | 117 | 120 | 116 | 119 |
|  | Zero-degree flexural strength [2] | MPa | | 1508 | 1467 | 1410 | 1501 | 1480 | 1520 |
|  | Tg | ° C. | | −25,113 | −25,110 | −53,92 | −25,111 | −25,113 | −27,112 |

|  |  |  |  | Example | | | | |
|---|---|---|---|---|---|---|---|---|
|  |  |  |  | 7 | 8 | 9 | 10 | 11 |
| Prepreg | Component (A) | Material name | | A-1 3 | A-1 3 | A-1 3 | A-1 3 | A-1 3 |
|  | Component (B) | % by mass | | Reference Example 4 33 | Reference Example 2 33 | Reference Example 5 33 | Reference Example 17 33 | Reference Example 6 33 |

TABLE 5-continued

|  |  |  |  |  |  |  |  |
|---|---|---|---|---|---|---|---|
| | | Component (C) | | C-1 64 | C-1 64 | C-1 64 | C-1 64 | C-1 64 |
| | | Component (D) | — | — | — | — | — | — |
| | | Surface where (A) is present | — | One surface | One surface | One surface | One surface | One surface |
| | | Surface localization rate | % | 99 | 99 | 98 | 98 | 98 |
| Fiber-reinforced composite material | | Stacked structure [1] | | (I) | (I) | (I) | (I) | (I) |
| | | Interlayer localization rate | % | 97 | 97 | 97 | 95 | 96 |
| | | Loss factor | — | 0.0071 | 0.0073 | 0.0077 | 0.0074 | 0.0071 |
| | | 90-degree flexural strength [2] | MPa | 124 | 125 | 134 | 129 | 123 |
| | | Zero-degree flexural modulus [2] | GPa | 125 | 115 | 123 | 118 | 123 |
| | | Zero-degree flexural strength [2] | MPa | 1497 | 1530 | 1573 | 1592 | 1503 |
| | | Tg | °C. | −27,106 | −27,109 | −27,128 | −24,86 | −27,134 |

[1] Stacked structure
(I) Component (A) is placed between all layers.
(II) Component (A) is placed between central layers only.
[2] Value converted for Vf 60%

TABLE 6

| | | | Example | | | | | |
|---|---|---|---|---|---|---|---|---|
| | | | 12 | 13 | 14 | 15 | 16 | 17 |
| Prepreg | Component (A) | Material name | A-1 3 | A-1 3 | A-1 3 | A-1 3 | A-1 3 | A-1 3 |
| | Component (B) | % by mass | Reference Example 7 33 | Reference Example 8 33 | Reference Example 9 33 | Reference Example 10 33 | Reference Example 12 33 | Reference Example 13 33 |
| | Component (C) | | C-1 64 | C-1 64 | C-1 64 | C-1 64 | C-1 64 | C-1 64 |
| | Component (D) | | — | — | — | — | — | — |
| | Surface(s) where (A) is present | — | One surface | One surface | One surface | One surface | One surface | One surface |
| | Surface localization rate | % | 99 | 99 | 99 | 98 | 99 | 99 |
| Fiber-reinforced composite material | Stacked structure [1] | | (I) | (I) | (I) | (I) | (I) | (I) |
| | Interlayer localization rate | % | 97 | 95 | 96 | 95 | 95 | 96 |
| | Loss factor | — | 0.0076 | 0.0073 | 0.0071 | 0.0076 | 0.0072 | 0.0072 |
| | 90-degree flexural strength [2] | MPa | 137 | 132 | 116 | 133 | 123 | 127 |
| | Zero-degree flexural modulus [2] | GPa | 117 | 125 | 124 | 121 | 122 | 121 |
| | Zero-degree flexural strength [2] | MPa | 1715 | 1572 | 1483 | 1615 | 1510 | 1539 |
| | Tg | °C. | −28162 | −29138 | −28128 | −27191 | −27108 | −27.99 |

| | | | Example | | | | |
|---|---|---|---|---|---|---|---|
| | | | 18 | 19 | 20 | 21 | 22 |
| Prepreg | Component (A) | Material name | A-1 3 | A-1 3 | A-1 3 | A-1 3 | A-1 1.5 × 2 |
| | Component (B) | % by mass | Reference Example 14 33 | Reference Example 15 33 | Reference Example 1 21 | Reference Example 16 21 | Reference Example 1 33 |
| | Component (C) | | C-1 64 | C-1 64 | C-1 64 | C-1 64 | C-1 64 |
| | Component (D) | | — | — | Reference Example 16 12 | Reference Example 16 12 | — |
| | Surface(s) where (A) is present | — | One surface | One surface | One surface | One surface | Both surfaces |
| | Surface localization rate | % | 99 | 98 | 99 | 98 | 99 |
| Fiber-reinforced composite material | Stacked structure [1] | | (I) | (I) | (I) | (I) | (I) |
| | Interlayer localization rate | % | 96 | 97 | 96 | 95 | 96 |
| | Loss factor | — | 0.0077 | 0.0073 | 0.0072 | 0.0072 | 0.0070 |
| | 90-degree flexural strength [2] | MPa | 137 | 121 | 120 | 122 | 123 |

TABLE 6-continued

|  |  |  |  |  |  |  |  |
|---|---|---|---|---|---|---|---|
|  | Zero-degree flexural modulus [2] | GPa | 121 | 115 | 118 | 123 | 121 |
|  | Zero-degree flexural strength [2] | MPa | 1761 | 1505 | 1512 | 1487 | 1513 |
|  | Tg | °C. | −26191 | −27114 | −27113 | −27113 | −26114 |

[1] Stacked structure
(I) Component (A) is placed between all layers.
(II) Component (A) is placed between central layers only.

[2] Value converted for Vf 60%

TABLE 7

|  |  |  | Example | | | | | |
|---|---|---|---|---|---|---|---|---|
|  |  |  | 23 | 24 | 25 | 26 | 27 | 28 |
| Prepreg | Component (A) | Material name | A-1 3 | A-1 3 | A-1 3 | A-1 3 | A-1 3 | A-1 3 |
|  | Component (B) | % by mass | Reference Example 18 33 | Reference Example 19 33 | Reference Example 20 33 | Reference Example 21 33 | Reference Example 22 33 | Reference Example 23 33 |
|  | Component (C) |  | C-1 64 | C-1 64 | C-1 64 | C-1 64 | C-1 64 | C-1 64 |
|  | Component (D) |  | — | — | — | — | — | — |
|  | Surface where (A) is present | — | One surface | One surface | One surface | One surface | One surface | One surface |
|  | Surface localization rate | % | 99 | 98 | 98 | 97 | 99 | 99 |
| Fiber-reinforced composite material | Stacked structure [1] |  | (I) | (I) | (I) | (I) | (I) | (I) |
|  | Interlayer localization rate | % | 96 | 97 | 95 | 98 | 97 | 97 |
|  | Loss factor | — | 0.0083 | 0.0082 | 0.0080 | 0.0074 | 0.0081 | 0.0085 |
|  | 90-degree flexural strength [2] | MPa | 121 | 118 | 118 | 126 | 125 | 124 |
|  | Zero-degree flexural modulus [2] | GPa | 123 | 115 | 122 | 121 | 118 | 116 |
|  | Zero-degree flexural strength [2] | MPa | 1482 | 1495 | 1477 | 1557 | 1541 | 1542 |
|  | Tg | °C. | −26,115 | −25,114 | −25,114 | −25,104 | −27,104 | −26,104 |

|  |  |  | Example | | | | |
|---|---|---|---|---|---|---|---|
|  |  |  | 29 | 30 | 31 | 32 | 33 |
| Prepreg | Component (A) | Material name | A-1 3 | A-1 3 | A-1 3 | A-1 3 | A-1 3 |
|  | Component (B) | % by mass | Reference Example 24 33 | Reference Example 1 33 | Reference Example 1 33 | Reference Example 1 33 | Reference Example 1 33 |
|  | Component (C) |  | C-1 64 | C-3 64 | C-4 64 | C-5 64 | C-6 64 |
|  | Component (D) |  | — | — | — | — | — |
|  | Surface where (A) is present | — | One surface | One surface | One surface | One surface | One surface |
|  | Surface localization rate | % | 98 | 98 | 97 | 98 | 97 |
| Fiber-reinforced composite material | Stacked structure [1] |  | (I) | (I) | (I) | (I) | (I) |
|  | Interlayer localization rate | % | 97 | 98 | 98 | 96 | 97 |
|  | Loss factor | — | 0.0078 | 0.0105 | 0.0122 | 0.0141 | 0.0149 |
|  | 90-degree flexural strength [2] | MPa | 127 | 124 | 105 | 95 | 89 |
|  | Zero-degree flexural modulus [2] | GPa | 119 | 151 | 188 | 222 | 237 |
|  | Zero-degree flexural strength [2] | MPa | 1543 | 1451 | 1312 | 1263 | 1161 |
|  | Tg | °C. | −25,102 | −25,112 | −27,113 | −26,114 | −25,113 |

[1] Stacked structure
(I) Component (A) is placed between all layers.
(II) Component (A) is placed between central layers only.

[2] Value converted for Vf 60%

TABLE 8

|  |  |  | Comparative Example | | | | | |
|---|---|---|---|---|---|---|---|---|
|  |  |  | 1 | 2 | 3 | 4 | 5 | 6 |
| Prepreg | Component (A) | Material name | — | — | — | — | — | — |
|  | Component (B) | % by mass | Reference Example 1 32 | Reference Example 2 32 | Reference Example 3 32 | Reference Example 4 32 | Reference Example 5 32 | Reference Example 17 32 |
|  | Component (C) |  | C-1 68 | C-1 68 | C-1 68 | C-1 68 | C-1 68 | C-1 68 |
|  | Component (D) |  | — | — | — | — | — | — |
|  | Surface where (A) is present |  | — | — | — | — | — | — |
|  | Surface localization rate | % | — | — | — | — | — | — |
| Fiber-reinforced composite material | Stacked structure [1] |  | — | — | — | — | — | — |
|  | Interlayer localization rate | % | — | — | — | — | — | — |
|  | Loss factor | — | 0.0052 | 0.0052 | 0.0053 | 0.0052 | 0.0054 | 0.0050 |
|  | 90-degree flexural strength [2] | MPa | 123 | 127 | 124 | 126 | 135 | 132 |
|  | Zero-degree flexural modulus [2] | GPa | 121 | 119 | 124 | 125 | 120 | 115 |
|  | Zero-degree flexural strength [2] | MPa | 1505 | 1521 | 1515 | 1492 | 1565 | 1606 |
|  | Tg | °C. | 114 | 109 | 111 | 105 | 129 | 84 |

|  |  |  | Comparative Example | | | |
|---|---|---|---|---|---|---|
|  |  |  | 7 | 8 | 9 | 10 |
| Prepreg | Component (A) | Material name | — | — | — | — |
|  | Component (B) | % by mass | Reference Example 6 32 | Reference Example 7 32 | Reference Example 8 32 | Reference Example 9 32 |
|  | Component (C) |  | C-1 68 | C-1 68 | C-1 68 | C-1 68 |
|  | Component (D) |  | — | — | — | — |
|  | Surface where (A) is present |  | — | — | — | — |
|  | Surface localization rate | % | — | — | — | — |
| Fiber-reinforced composite material | Stacked structure [1] |  | — | — | — | — |
|  | Interlayer localization rate | % | — | — | — | — |
|  | Loss factor | — | 0.0052 | 0.0055 | 0.0053 | 0.005 |
|  | 90-degree flexural strength [2] | MPa | 124 | 140 | 133 | 120 |
|  | Zero-degree flexural modulus [2] | GPa | 118 | 118 | 119 | 125 |
|  | Zero-degree flexural strength [2] | MPa | 1511 | 1701 | 1584 | 1473 |
|  | Tg | °C. | 133 | 162 | 136 | 128 |

[1] Stacked structure
(I) Component (A) is placed between all layers.
(II) Component (A) is placed between central layers only.
[2] Value converted for Vf 60%

TABLE 9

|  |  |  | 11 | 12 | 13 | 14 | 15 | 16 |
|---|---|---|---|---|---|---|---|---|
| Prepreg | Component (A) | Material name | — | — | — | — | — | — |
|  | Component (B) | % by mass | Reference Example 10 32 | Reference Example 12 32 | Reference Example 13 32 | Reference Example 14 32 | Reference Example 15 32 | Reference Example 16 32 |
|  | Component (C) |  | C-1 68 | C-1 68 | C-1 68 | C-1 68 | C-1 68 | C-1 68 |
|  | Component (D) |  | — | — | — | — | — | — |
|  | Surface where (A) is present |  | — | — | — | — | — | — |
|  | Surface localization rate | % | — | — | — | — | — | — |
| Fiber-reinforced composite material | Stacked structure [1] |  | — | — | — | — | — | — |
|  | Interlayer localization rate | % | — | — | — | — | — | — |
|  | Loss factor | — |  | 0.0054 | 0.0052 | 0.0052 | 0.0054 | 0.0053 | 0.0052 |

TABLE 9-continued

|  |  |  |  |  |  |  |  |  |
|---|---|---|---|---|---|---|---|---|
|  | 90-degree flexural strength [2] | MPa | 136 | 124 | 128 | 138 | 123 | 124 |
|  | Zero-degree flexural modulus [2] | GPa | 124 | 122 | 117 | 118 | 120 | 117 |
|  | Zero-degree flexural strength [2] | MPa | 1597 | 1508 | 1553 | 1790 | 1505 | 1496 |
|  | Tg | °C. | 190 | 108 | 98 | 191 | 114 | 113 |

|  |  |  |  | 17 | 18 | 19 | 20 | 21 |
|---|---|---|---|---|---|---|---|---|
| Prepreg | Component (A) | Material name | — | — | — | — | — | — |
|  | Component (B) | % by mass | Reference Example 18 | Reference Example 19 | Reference Example 20 | Reference Example 21 | Reference Example 22 | |
|  |  |  | 32 | 32 | 32 | 32 | 32 | |
|  | Component (C) |  | C-1 | C-1 | C-1 | C-1 | C-1 | |
|  |  |  | 68 | 68 | 68 | 68 | 68 | |
|  | Component (D) |  | — | — | — | — | — | |
|  | Surface where (A) is present |  | — | — | — | — | — | |
|  | Surface localization rate | % | — | — | — | — | — | |
| Fiber-reinforced composite material | Stacked structure [1] |  | — | — | — | — | — | |
|  | Interlayer localization rate | % | — | — | — | — | — | |
|  | Loss factor | — | 0.0058 | 0.0057 | 0.0055 | 0.0051 | 0.0057 | |
|  | 90-degree flexural strength [2] | MPa | 124 | 121 | 120 | 129 | 128 | |
|  | Zero-degree flexural modulus [2] | GPa | 120 | 123 | 122 | 117 | 123 | |
|  | Zero-degree flexural strength [2] | MPa | 1489 | 1486 | 1480 | 1556 | 1549 | |
|  | Tg | °C. | 114 | 115 | 113 | 103 | 105 | |

[1] Stacked structure
(I) Component (A) is placed between all layers.
(II) Component (A) is placed between central layers only.
[2] Value converted for Vf 60%

TABLE 10

|  |  |  | Comparative Example | | | | | |
|---|---|---|---|---|---|---|---|---|
|  |  |  | 22 | 23 | 24 | 25 | 26 | 27 |
| Prepreg | Component (A) | Material name | — | — | A-8 | A-4 | A-5 | A-6 |
|  |  |  |  |  | 15 | 3 | 3 | 3 |
|  | Component (B) | % by mass | Reference Example 23 | Reference Example 24 | Reference Example 1 | Reference Example 1 | Reference Example 1 | Reference Example 1 |
|  |  |  | 32 | 32 | 27 | 33 | 33 | 33 |
|  | Component (C) |  | C-1 | C-1 | C-1 | C-1 | C-1 | C-1 |
|  |  |  | 68 | 68 | 58 | 64 | 64 | 64 |
|  | Component (D) |  | — | — | — | — | — | — |
|  | Surface where (A) is present |  | — | — | One surface | One surface | One surface | One surface |
|  | Surface localization rate | % | — | — | 100 | — | 97 | 88 |
| Fiber-reinforced composite material | Stacked structure [1] |  | — | — | (I) | (I) | (I) | (I) |
|  | Interlayer localization rate | % | — | — | 100 | — | 95 | 83 |
|  | Loss factor | — | 0.0058 | 0.0053 | 0.0296 | 0.0058 | 0.0060 | 0.0057 |
|  | 90-degree flexural strength [2] | MPa | 127 | 127 | 99 | 104 | 122 | 98 |
|  | Zero-degree flexural modulus [2] | GPa | 121 | 123 | 81 | 98 | 125 | 85 |
|  | Zero-degree flexural strength [2] | MPa | 1546 | 1541 | 978 | 1367 | 1508 | 1391 |
|  | Tg | °C. | 104 | 102 | −56,93 | 86 | −3,113 | −4,112 |

|  |  |  | Comparative Example | | | | |
|---|---|---|---|---|---|---|---|
|  |  |  | 28 | 29 | 30 | 31 | 32 |
| Prepreg | Component (A) | Material name | A-7 | — | — | — | — |
|  |  |  | 3 |  |  |  |  |
|  | Component (B) | % by mass | Reference Example 1 | Reference Example 1 | Reference Example 1 | Reference Example 1 | Reference Example 1 |
|  |  |  | 33 | 32 | 32 | 32 | 32 |

TABLE 10-continued

|  |  |  | C-1 | C-3 | C-4 | C-5 | C-6 |
|---|---|---|---|---|---|---|---|
|  | Component (C) |  | 64 | 68 | 68 | 68 | 68 |
|  | Component (D) |  | — | — | — | — | — |
|  | Surface where (A) is present |  | — | One surface | — | — | — |
|  | Surface localization rate | % | 100 | — | — | — | — |
| Fiber-reinforced composite material | Stacked structure [1] |  | (I) | — | — | — | — |
|  | Interlayer localization rate | % | 99 | — | — | — | — |
|  | Loss factor | — | 0.0074 | 0.0087 | 0.0106 | 0.0119 | 0.0127 |
|  | 90-degree flexural strength [2] | MPa | 108 | 126 | 107 | 98 | 94 |
|  | Zero-degree flexural modulus [2] | GPa | 100 | 152 | 187 | 223 | 237 |
|  | Zero-degree flexural strength [2] | MPa | 1507 | 1445 | 1305 | 1255 | 1155 |
|  | Tg | °C. | −3,114 | 113 | 113 | 112 | 114 |

[1] Stacked structure
(I) Component (A) is placed between all layers.
(II) Component (A) is placed between central layers only.
[2] Value converted for Vf 60%

TABLE 11

|  |  |  | Example 34 | Comparative Example 33 |
|---|---|---|---|---|
| Fiber-reinforced composite material | Component (E) | Material name | A-1 7 | — |
|  | Component (F) | % by mass | Reference Example 11 30 | Reference Example 11 32 |
|  | Component (G) |  | C-2 63 | C-2 68 |
|  | Component (H) |  | — | — |
|  | Stacked structure [1] |  | (I) | — |
|  | Interlayer localization rate | % | 95 | — |
|  | Loss factor | — | 0.0058 | 0.0042 |
|  | Flexural strength [2] | MPa | 939 | 958 |
|  | Tg | °C. | −26,142 | 141 |

[1] Stacked structure (I) Component (A) is placed between all layers. (II) Component (A) is placed between central layers only.
[2] Value converted for Vf 60%

EXPLANATION OF NUMERALS

1: Average thickness of prepreg
2: Surface previously in contact with support plate
3. Parallel line located at 20% of prepreg thickness
4: Averaged borderline
5: Average center thickness line
A: Component (A)
B: Component (B)
C: Component (C)
D: Component (D)
E: Component (E)
F: Component (F)
G: Component (G)
H: Component (H)

INDUSTRIAL APPLICABILITY

The present invention provides a fiber-reinforced composite material which excels in rigidity, strength, and vibration damping properties, and a prepreg which is suitably used for production thereof. Thus, by means of the fiber reinforced composite material and the prepreg of the present invention, it is possible to improve vibration damping properties of fiber reinforced composite material without reducing rigidity or strength, by causing urethane particles having high vibration damping properties and a three-dimensional cross-linked structure to be localized between fiber reinforced composite material layers. The present invention is useful for purposes such as improvement in the ball hitting feeling of golf club shafts, increase in shock absorbing properties of tennis rackets, and improvement in fish bite sensitivity of fishing rods.

The invention claimed is:

1. A prepreg containing components (A) to (C) defined below, wherein component (A) is disposed in or on one surface or both surfaces of a layer comprising components (B) and (C), and 90% or more of component (A) is present in a region extending from the surface(s) of the resulting prepreg containing components (A) to (C) to a depth equal to 20% of the average thickness of the prepreg:
   (A) urethane particles having tan δ of 0.15 or more at 10° C., having a three-dimensional cross-linked structure and having surfaces coated with hydrophobic silica,
   (B) a first epoxy resin composition, and
   (C) reinforcing fiber.

2. A prepreg as set forth in claim 1, wherein component (A) is incompatible with component (B).

3. A prepreg as set forth in claim 1, wherein the average particle diameter of component (A) is in the range of 5 to 20 μm.

4. A prepreg as set forth in claim 1, wherein component (A) accounts for 2 to 20% by mass of the prepreg.

5. A prepreg as set forth in claim 1, wherein component (B) is an epoxy resin composition containing epoxy resin with an epoxy equivalent of 800 to 5,500.

6. A prepreg as set forth in claim 1, wherein component (C) is carbon fiber.

7. A prepreg as set forth in claim 6, wherein component (C) is carbon fiber having a tensile modulus of 230 to 550 Gpa.

8. A prepreg as set forth in claim 1 further comprising component (D) defined below, wherein said component (D) is placed on one surface or both surfaces of a layer comprising components (B) and (C), and wherein component (A) exists in a state of being contained in component (D):
   (D) a second epoxy resin composition incompatible with component (A).

9. A prepreg as set forth in claim 8, wherein component (D) is identical to component (B).

10. A method for producing a prepreg as set forth in claim 1 containing a step of impregnating component (C) with component (B) to prepare a prepreg precursor and a step of sticking component (A) to the prepreg precursor.

11. A method for producing a prepreg as set forth in claim 8 containing steps (I) to (III) as described below:
   (I) a step of dispersing component (A) in component (D) and forming a film thereof,
   (II) a step of impregnating component (C) with component (B) to prepare a prepreg precursor, and
   (III) a step of sticking the film obtained in step (I) to the prepreg precursor obtained in step (II).

12. A fiber-reinforced composite material containing components (E) to (G) defined below, wherein 90% or more of component (E) is localized in interlayer regions when observed in a cross-section:
   (E) urethane particles having tan δ of 0.15 or more at 10° C., having a three-dimensional cross-linked structure and having surfaces coated with hydrophobic silica,
   (F) a cured product of a third epoxy resin composition, and
   (G) reinforcing fiber.

13. A fiber-reinforced composite material as set forth in claim 12 further comprising component (H) defined below, wherein said component (E) exists in a state of being contained in component (H):
   (H) a cured product of a fourth epoxy resin composition.

14. A fiber-reinforced composite material as set forth in claim 12, wherein the loss factor of said fiber-reinforced composite material is 130% or more of the loss factor of a fiber-reinforced composite material which is the same as said fiber-reinforced composite material except that component (E) is not contained.

15. A fiber-reinforced composite material as set forth in claim 12, wherein the flexural strength of said fiber-reinforced composite material is 90% or more of the flexural strength of a fiber-reinforced composite material which is the same as said fiber-reinforced composite material except that component (E) is not contained.

* * * * *